(12) United States Patent
Campbell

(10) Patent No.: US 9,727,838 B2
(45) Date of Patent: Aug. 8, 2017

(54) ON-SHELF TRACKING SYSTEM

(75) Inventor: Patrick Campbell, Raleigh, NC (US)

(73) Assignee: Triangle Strategy Group, LLC, Raleigh, NC (US)

( * ) Notice: Subject to any disclaimer, the term of this patent is extended or adjusted under 35 U.S.C. 154(b) by 548 days.

(21) Appl. No.: 13/422,736

(22) Filed: Mar. 16, 2012

(65) Prior Publication Data

US 2012/0245969 A1    Sep. 27, 2012
US 2013/0117053 A2    May 9, 2013

Related U.S. Application Data

(60) Provisional application No. 61/453,942, filed on Mar. 17, 2011.

(51) Int. Cl.
*G06Q 10/00* (2012.01)
*G06Q 10/08* (2012.01)

(52) U.S. Cl.
CPC .................................. *G06Q 10/087* (2013.01)

(58) Field of Classification Search
USPC ........ 705/7.11–7.42; 700/213–218, 228–229
See application file for complete search history.

(56) References Cited

U.S. PATENT DOCUMENTS 4,212,361 A    7/1980 Stocker
4,653,651 A *  3/1987 Flum ..................... B65D 71/70
                                                  108/53.1
4,660,160 A    4/1987 Tajima et al.
(Continued)

FOREIGN PATENT DOCUMENTS

JP    05-135084 A    6/1993
JP    05-278817 A    10/1993
(Continued)

OTHER PUBLICATIONS http://blogs.wsj.com/cio/2013/10/11/snackmaker-modernizes-the-impulse-buy-with-sensor.*
(Continued)

*Primary Examiner* — Beth V Boswell
*Assistant Examiner* — Benjamin S Fields
(74) *Attorney, Agent, or Firm* — Westman, Champlin & Koehler, P.A.

(57) ABSTRACT

A system to be installed on a merchandising unit having one or more inventory zones, one or more units of product, one or more product sensors, a mounting structure, and an electromagnetic signal processor. The one or more inventory zones can present the one or more units of product in several different arrangements. The one or more product sensors, each at least associated operatively with one of the one or more inventory zones, converts a sensed quantity of the one or more units of product into a respective analog electromagnetic signal. The mounting structure secures the one or more product sensors to the merchandising unit relative to the one or more units of product so that the one or more product sensors sense a quantity of the one or more units of product. The electromagnetic signal processor in communication with the one or more product sensors can sample output from the one or more product sensors periodically and converts the analog signal into a digital signal.

21 Claims, 29 Drawing Sheets

(56) References Cited

U.S. PATENT DOCUMENTS

| | | | |
|---|---|---|---|
| 4,723,819 A * | 2/1988 | Ramberg | A47F 7/08 211/129.1 |
| 4,801,025 A * | 1/1989 | Flum | A47F 5/005 211/126.1 |
| 4,819,015 A * | 4/1989 | Bullivant | G07G 1/0054 340/568.8 |
| 4,925,038 A * | 5/1990 | Gajewski | A47F 5/0018 211/128.1 |
| 4,982,849 A * | 1/1991 | Flum | A47B 87/0246 211/188 |
| 5,000,274 A * | 3/1991 | Bullivant | G08B 13/1472 177/128 |
| 5,332,575 A | 7/1994 | Redziniak et al. | |
| 5,351,838 A * | 10/1994 | Flum | A47F 5/005 211/153 |
| 5,376,948 A | 12/1994 | Roberts | |
| 5,450,971 A * | 9/1995 | Boron | A47F 1/12 108/107 |
| 5,549,373 A * | 8/1996 | Bustos | A47F 3/10 312/125 |
| 5,645,182 A * | 7/1997 | Miller, Jr. | A47F 1/12 108/107 |
| 5,781,443 A | 7/1998 | Street et al. | |
| 6,184,521 B1 | 2/2001 | Coffin, IV et al. | |
| 6,296,523 B1 | 10/2001 | Sasai | |
| 6,484,894 B2 * | 11/2002 | Kiffmeyer | A47F 5/13 211/103 |
| 6,588,606 B2 * | 7/2003 | Miller, Jr. | A47F 3/0486 211/88.01 |
| 6,688,478 B2 * | 2/2004 | Miller, Jr. | A47F 5/0031 211/118 |
| 6,752,277 B1 | 6/2004 | Sempliner | |
| 6,877,618 B2 * | 4/2005 | Mason | A47F 5/0018 211/59.2 |
| 6,878,896 B2 | 4/2005 | Esslinger et al. | |
| 6,886,746 B1 | 5/2005 | Edwards | |
| 7,322,520 B2 * | 1/2008 | Warden | G06Q 30/06 235/375 |
| 7,516,848 B1 | 4/2009 | Shakes et al. | |
| 7,561,717 B2 | 7/2009 | Anderson | |
| 7,584,016 B2 | 9/2009 | Weaver | |
| 7,693,757 B2 | 4/2010 | Zimmerman | |
| 7,994,914 B2 | 8/2011 | Irmscher et al. | |
| 8,025,187 B2 * | 9/2011 | Sottosanti, Jr. | A47F 1/126 206/557 |
| 8,651,288 B2 * | 2/2014 | Squitieri | A47F 1/12 211/184 |
| 2002/0161651 A1 | 10/2002 | Godsey et al. | |
| 2003/0001223 A1 | 1/2003 | Gremm | |
| 2003/0038099 A1 * | 2/2003 | Bauman | A47F 5/0018 211/71.01 |
| 2004/0098298 A1 | 5/2004 | Yin | |
| 2004/0254759 A1 | 12/2004 | Kubach et al. | |
| 2005/0103850 A1 | 5/2005 | Mergenthaler et al. | |
| 2005/0131578 A1 * | 6/2005 | Weaver | G01G 19/4144 700/244 |
| 2005/0171854 A1 * | 8/2005 | Lyon | G01G 19/4144 705/24 |
| 2005/0177423 A1 | 8/2005 | Swanson, Sr. | |
| 2005/0270149 A1 | 12/2005 | Standing | |
| 2005/0286220 A1 * | 12/2005 | Moore | H05K 7/20836 361/679.46 |
| 2006/0071774 A1 * | 4/2006 | Brown | G06Q 10/087 340/522 |
| 2006/0092042 A1 | 5/2006 | Davis et al. | |
| 2006/0216138 A1 | 9/2006 | Schaefer | |
| 2006/0238307 A1 * | 10/2006 | Bauer | G06K 7/0008 340/10.1 |
| 2007/0050271 A1 * | 3/2007 | Ufford | G06Q 10/087 705/28 |
| 2007/0067203 A1 | 3/2007 | Gil et al. | |
| 2007/0193971 A1 * | 8/2007 | Hardy | A47F 1/125 211/189 |
| 2007/0255665 A1 | 11/2007 | Oosugi et al. | |
| 2008/0082360 A1 | 4/2008 | Bailey et al. | |
| 2008/0159634 A1 * | 7/2008 | Sharma | G06K 9/00771 382/224 |
| 2008/0186167 A1 * | 8/2008 | Ramachandra | G06Q 10/087 340/539.21 |
| 2008/0186174 A1 * | 8/2008 | Alexis | G07G 1/0036 340/572.1 |
| 2009/0179753 A1 | 7/2009 | Bonner et al. | |
| 2009/0192921 A1 * | 7/2009 | Hicks | G06F 3/0312 705/28 |
| 2009/0207022 A1 | 8/2009 | Reckeweg et al. | |
| 2009/0210324 A1 * | 8/2009 | Bhogal | G06Q 10/087 705/28 |
| 2009/0233714 A1 * | 9/2009 | Toro | A63F 13/06 463/39 |
| 2009/0234668 A1 * | 9/2009 | Wheeler | G06Q 10/087 705/346 |
| 2009/0294479 A1 * | 12/2009 | Sottosanti, Jr. | A47F 1/126 222/192 |
| 2010/0010868 A1 * | 1/2010 | Aimone Catti | G06Q 10/107 705/28 |
| 2010/0023300 A1 | 1/2010 | Farry et al. | |
| 2010/0065632 A1 * | 3/2010 | Babcock | G06Q 10/08 235/385 |
| 2010/0139989 A1 | 6/2010 | Atwater et al. | |
| 2010/0164479 A1 | 7/2010 | Alameh et al. | |
| 2010/0327164 A1 | 12/2010 | Costello et al. | |
| 2011/0010275 A1 | 1/2011 | Hull | |
| 2012/0185590 A1 * | 7/2012 | Kolin | H05K 7/20836 709/224 |
| 2012/0245969 A1 * | 9/2012 | Campbell | G06Q 10/087 705/7.11 |
| 2013/0071210 A1 * | 3/2013 | Lanigan, Sr. | B66C 17/06 414/281 |
| 2013/0117053 A2 | 5/2013 | Campbell | |
| 2014/0110584 A1 * | 4/2014 | Campbell | G06Q 30/0261 250/340 |
| 2014/0114708 A1 | 4/2014 | Campbell | |
| 2014/0289009 A1 | 9/2014 | Campbell | |
| 2015/0184997 A1 | 7/2015 | Campbell | |

FOREIGN PATENT DOCUMENTS

| | | |
|---|---|---|
| JP | 09-288764 A | 11/1997 |
| JP | 2008-247558 A | 10/2008 |
| KR | 10-1998-0074218 A | 11/1998 |
| KR | 10-0935341 B1 | 1/2010 |
| WO | 2012125960 A2 | 9/2012 |
| WO | WO 2014/107457 A1 | 7/2014 |
| WO | WO 2014/107462 A1 | 7/2014 |

OTHER PUBLICATIONS

International Search Report received in corresponding International Application No. PCT/US12/029518, 16 pages, dated Sep. 21, 2012.

Notification of Transmittal of the International Search Report and the Written Opinion of the International Searching Authority, or the Declaration for International Application No. PCT/US2013/078529 (Apr. 29, 2014).

Notification of Transmittal of the International Search Report and the Written Opinion of the International Searching Authority, or the Declaration for International Application No. PCT/US2013/078509 (Apr. 24, 2014).

Communication of European Publication Number and Information on the Application of Article 67(3) EPC for European Patent Application No. 12717507.3 (Jan. 15, 2014).

"Snackmaker Modernizes the Impulse Buy with Sensors, Analytics," CIO Journal, The Wall Street Journal, pp. 13 (Oct. 11, 2013).

Notification of Transmittal of the International Search Report and the Written Opinion of the International Searching Authority, or the Declaration for International Application No. PCT/US12/29518 (Sep. 21, 2012).

Non-Final Office Action and Examiner-Initiated Interview Summary dated Apr. 6, 2015 for corresponding U.S. Appl. No. 14/145,561, filed Dec. 31, 2013.

(56) References Cited

OTHER PUBLICATIONS

Non-Final Office Action dated Apr. 24, 2015 for corresponding U.S. Appl. No. 14/586,389, filed Dec. 30, 2014.
First Examination Report dated Jul. 14, 2014 for New Zealand Patent Application No. 614984.
Commonly assigned, co-pending U.S. Appl. No. 14/586,389 for "Methods Systems and Computer Readable Media for Tracking Human Interactions with Objects Using Modular Sensor Segments", filed Dec. 30, 2014.
Notification of Transmittal of the International Search Report and Written Opinion of the International Searching Authority, or the Declaration for International Application No. PCT/US2014/072776 (Mar. 12, 2015).
Amendment dated Oct. 25, 2016 for U.S. Appl. No. 14/586,389.
Final Office Action dated Nov. 21, 2016 for U.S. Appl. No. 14/586,389.
Final Office Action dated Jan. 29, 2016 for corresponding U.S. Appl. No. 14/145,561.
Non-Final Office Action dated Aug. 29, 2016 for U.S. Appl. No. 14/145,649.
Final Office Action dated Jan. 21, 2016 for U.S. Appl. No. 14/586,389.
Non-Final Office Action dated Apr. 28, 2016 for U.S. Appl. No. 14/586,389.
Non-Final Office Action dated Oct. 25, 2016 for U.S. Appl. No. 14/145,561.

* cited by examiner inventory zone events

| Event Name | Event Description |
|---|---|
| setup event | Initial installation of inventory zone |
| touch event | Any touch sensed by the inventory zone |
| single item pickup event | A single item pickup sensed by the inventory zone |
| multiple items pickup event | multiple items pickup sensed by the inventory zone |
| single return item event | A single return item sensed by the inventory zone |
| multiple return items event | multiple return items sensed by the inventory zone |
| restock event | An inventory zone restock sensed by the inventory zone |
| error event | An error sensed by the inventory zone |

Figure 29

ON-SHELF TRACKING SYSTEM

PRIORITY CLAIM

This application claims the benefit of priority from Provisional Patent Application No. 61/453,942, filed Mar. 17, 2011, which is incorporated by reference.

BACKGROUND OF THE INVENTION

Technical Field

This disclosure relates to systems for tracking consumer interactions with retail products on merchandising fixtures in real time.

Background Information

Consumer packaged goods (CPG) retailers and manufacturers are under continuous pressure to improve operational efficiencies, given intense competition, smaller profit margins and ever-increasing operational costs. Manufacturers and retailers work with a fixed amount of retail space and seek to maximize the productivity of that space in order to maximize revenues while controlling costs. Retailers seek to maximize overall revenues through optimal placement of top-performing existing store keeping units (SKUs), proper placement of new SKUs and elimination of less productive SKUs. This usually places a high demand on available shelf space and creates significant competition for shelf space in CPG retail stores. Both retailers and manufacturers commit significant data gathering and analysis to optimizing the productivity of that space.

Currently, CPG manufacturers and retailers use various product tracking techniques, including collecting scanner data from the systems of the retailers, and data consolidated by vendors such as Nielsen® or Information Resources, Inc. (IRI®). There are two limitations to using just scanner data, namely, (1) aggregation and (2) time. In terms of aggregation, scanner data is usually available at store level or at a national chain level (e.g., Kroger®, and Safeway®). In terms of time, data is typically available daily, weekly, or monthly. Because of these two limitations, testing of new products or merchandising arrangements must be done across a large number of stores and over a long period of time (e.g., weeks or months) to accurately detect the effect of the change. These limitations incur significant costs (e.g., typically testing of a new product or new merchandising arrangement requires 20+ stores over 2-3 months for any given "cell" in a test) and limit the number of experimental cells that can be executed. Hence, many valuable experiments that could be conducted are precluded by cost considerations, slowing the overall learning process by retailers and manufacturers and resulting in inefficient use of space.

Therefore, a need exists to address the problems noted above and other problems previously experienced.

SUMMARY

A system to be installed on a merchandising unit having one or more inventory zones, one or more units of product, one or more product sensors, a mounting structure, and an electromagnetic signal processor. The one or more inventory zones can present the one or more units of product in one or more of the following arrangements: (i) the one or more units of product arranged in a container in a geometric pattern of one or more layers deep, (ii) the one or more units of product arranged loosely in a container, or (iii) the one or more units of product each hanging from a peg hook. The one or more product sensors, each at least associated operatively with one of the one or more inventory zones, converts a sensed quantity of the one or more units of product into a respective analog electromagnetic signal. The mounting structure secures the one or more product sensors to the merchandising unit relative to the one or more units of product so that the one or more product sensors sense a quantity of the one or more units of product. The electromagnetic signal processor in communication with the one or more product sensors can sample output from the one or more product sensors periodically and converts the analog signal into a digital signal.

In some embodiments, a self-calibration system, in communication with the electromagnetic signal processor, detects background variability of the analog electromagnetic signal and therefrom establishes an activity threshold for each of the one or more product sensors. The activity threshold is a configurable multiple of the background variability and represents sensitivity of the associated product sensor.

In addition, in some embodiments, a pickup-event detection system, determines an initiation of an inventory event at one of the one or more inventory zones when variability of the respective analog signal exceeds the activity threshold. In such embodiments, the pickup-event detection system suspends self-calibration during the inventory event. Also, the pickup-event detection system identifies one or more other product sensors contributing to signaling the inventory event prior to completion of the inventory event. Further, the pickup-event detection system determines termination of the inventory event when the variability of each of the respective analog electromagnetic signals has returned below the activity threshold of each of the contributing product sensors.

Other systems, methods, features and advantages will be, or will become, apparent to one with skill in the art upon examination of the figures and detailed description. All such additional systems, methods, features and advantages are included within this description, are within the scope of the claimed subject matter, and are protected by the following claims.

BRIEF DESCRIPTION OF THE DRAWINGS

The system can be better understood with reference to the following drawings and description. The elements in the figures are not necessarily to scale, emphasis instead being placed upon illustrating the principles of the system. In the figures, like-referenced numerals designate corresponding parts throughout the different views.

FIG. 29 illustrates example inventory zone events.

DETAILED DESCRIPTION

Figure 1:
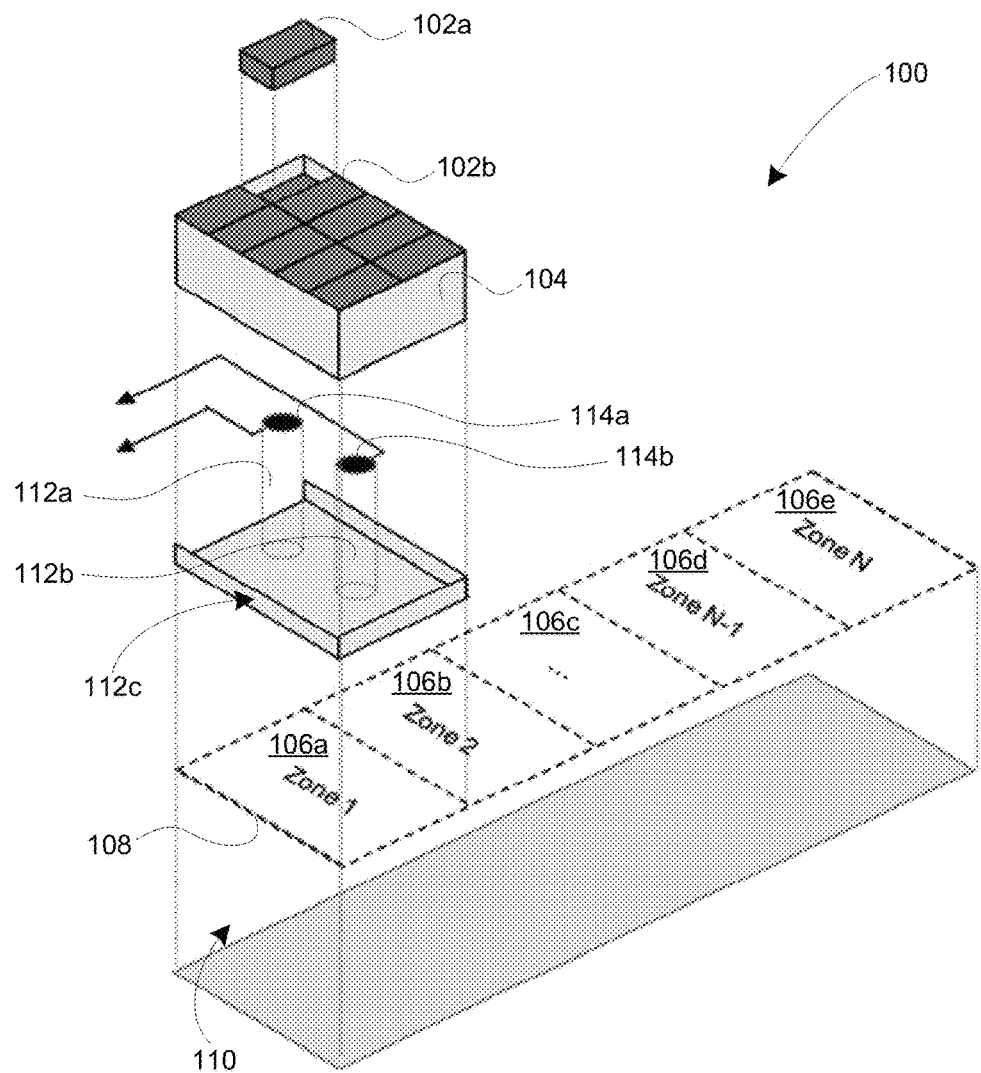
FIG. 1 illustrates example components of an on-shelf tracking (OST) system.

An on-shelf tracking (OST) system tracks consumer activity with respect to individual retail product units from a retail carton, while the retail carton is positioned on an array of sensors mounted on or in close proximity to a retail display shelf of a merchandising fixture. The OST system's various product sensors provide a way to determine when a consumer interacts with a retail product unit positioned on a retail shelf, a description of the interaction, and stores information about the interaction as an event in an event log for later retrieval and analysis. The retail product unit is the smallest increment of retail product offered by a retailer for purchase (e.g., a single pack of Wrigley® Five Rain gum, 15 sticks). The retail carton, also referred to as a product container, contains retail product units in a standard number and configuration (e.g., 10 ct box of Wrigley® Five Rain gum). The merchandising fixture displays retail products to consumers in an appealing fashion. Example merchandising fixtures include a checkout shelf, a peg hook, an aisle shelf, and a temporary cardboard display.

In some embodiments, product sensors convert an amount of product in the retail carton into a proportionate electromagnetic property. Example product sensors that can be implemented, alone or in various combinations, include a force sensitive resistor (FSR) sensor positioned underneath a retail carton, an ultrasonic probe positioned over the top of a retail carton, a capacitive sensor underneath a retail carton, an optical sensor, a charge-coupled device (CCD) camera and image analyzer, or any other type of sensor now known or later developed that can convert the amount of product in a retail carton into a proportionate electromagnetic property or digital signal. These sensors can be used individually and in multiples or in combination with each other, and with other sensors known in the art.

Also, in some embodiments, the OST system includes a mounting system used to position physically the product sensors securely on the merchandising fixture relative to the retail carton and the merchandising fixture, in order to maximize repeatability and reproducibility of product measurements by the OST system. The mounting system can also include a spacer adhered to the top of the FSRs, a peg hook pivot, and/or a flexible mat with a two dimensional array of sensors or any other known now or developed in the future physical arrangement of sensors that allows sensors to be in contact with or proximity the product.

With respect to the grouping of the product sensors, an inventory zone refers to a region including a group of the sensors assigned to and in contact with or in proximity to a retail carton or product (e.g., implemented as a tray containing one or more sensors, or a flexible mat with a two dimensional array of sensors). The OST system also includes at least one proximity sensor that detects the presence of actual and potential customers within a configurable proximity of a merchandising unit. The proximity sensor can be implemented as one or more ultrasonic distance sensors, infrared motion sensors, or any other set of proximity sensors now known or developed in the future that detects the presence of actual and potential customers within a configurable proximity of the merchandising unit.

Regarding the inventory zones, in particular, the zones can be configured with any number of sensor circuits arranged to optimize accuracy of identifying inventory zone events, and to accommodate various merchandising display formats (e.g., a level display shelf, tilted shelf, pegged wall and hook, and hanger display techniques). A display surface of a merchandising unit can include a display surface length dimension along a front display surface edge of the display surface in parallel to a rear display surface edge. Also, the merchandising unit can include a display surface depth dimension along a right and left side display surface edges of the display surface. Further, the inventory zones include an inventory zone length dimension measured parallel to the front or rear display surface edge of the display surface, and an inventory zone depth dimension parallel to the right or left display surface edge of the display surface.

Also, in some embodiments, the inventory zone can be configured with one load point, e.g., a rack display that includes multiple shelves having one load point, so that the sensor circuit senses activity for any product item on the rack. In addition to the one inventory zone for tracking activity for an entire rack, the rack can also be configured to include sensor circuits positioned at each corner of each shelf in the rack so that the set of sensor circuits positioned on a particular shelf of the rack measure activity for that shelf. Further, other sensor configurations can be implemented (e.g., strain gauges) depending on the display requirements. Also, the OST system can implement a load compensating mechanism that factors out the weight of a display rack when measuring activity at the rack.

Further, in some embodiments, the mounting system can be combined with a sheet of pliable material (e.g., flexible printed circuit board—PCB) having sensor circuits, so that the mounting system can be positioned on the display surface by unrolling the pliable material into place. Further, the mounting system can connect to a processor of the OST system through a multiplexed arrangement. Such a mounting system can be configurable into multiple inventory zones through software. The mounting system can include an on-board processor or processors that control and/or monitor all or a subset of the sensor circuits. Further, the mounting system can connect via a communications adapter (e.g., a wireless or hardwired communication interface) to a network, allowing communications between the sensor array and the processor. The OST system's processor can coordinate operations between onboard processors of each inventory zone in the OST system. Given this, a product manufacturer and retailer can in turn retrieve activity data for each inventory zone in real time, or the OST system can deliver the activity data to users (e.g., retailer, stocking clerk, product manufacturer, and third party subscribers) according to a delivery schedule configurable by individual users and/or an OST system administrator.

With respect to interaction between the abovementioned components, a sensor network communicates and/or transfers the signals from the aforementioned sensors to an electromagnetic signal processor that can include an analog-to-digital converter. The sensor network can be implemented either with wiring or through a wireless network, or any other network now known or developed in the future. In some embodiments, the OST system can communicate with its components and external systems, via a wireless or hardwire adapter, through a network (e.g., Internet or LAN).

Also, the OST system can include one or more sensor signal multiplexers/demultiplexers, e.g., the Texas Instruments® CD74HC4051-EP analog multiplexer/demultiplexer, which facilitate communication and/or transfer of signals from multiple sensors to an electromagnetic signal processor through a minimum number of wires and bandwidth. The electromagnetic signal processor can convert the electromagnetic signal outputted by the sensors into a digitizable property (e.g., voltage, current, or frequency). The electromagnetic signal processor can be an analog to digital converter, a frequency encoder/decoder, a digital signal processor, any combination thereof, or any other technology now known or later developed that is capable of converting an electromagnetic and/or optical signal into another analog signal or digital signal.

The OST system can also include a data acquisition system, a proximity signal processor, a data logging system, memory, a CPU, and OST system instructions stored in the memory and executable by the CPU (also referred to as the processor of the OST system). The data acquisition system converts the digitizable properties or signal outputted by the sensor into digital signal and then eventually readable data. A microcontroller or computer can be used to implement the data acquisition system. The proximity signal processor converts a signal corresponding to proximity of an object to the OST system (hereinafter referred to as a proximity signal) into a digital signal, and such functionality can also be implemented using a microcontroller or computer. Further, the data logging system converts digital signals into activity logs and can be implemented using a computer or microcontroller. With respect to the CPU, it performs the data processing operations that produce the activity log, and similarly, this processor of the OST system can be implemented via a computer and/or microcontroller. The OST system instructions specify operations that the processor can execute. Further, the OST system instructions can include, as an example, code segments found in C or any other programming language, DAQFactory®, LabView®, MATLAB®, or microcontroller code. Also, the OST system can include configurable parameters that include calibration data for each sensor, sensor assignments, and product assignments to inventory zones. Further, the OST system can generate activity logs that provide a permanent record of both product and proximity events at a merchandising fixture. The activity log can be stored on a removable SD card, and/or stored in the memory of the data logging system, and can be communicated and/or downloaded periodically via WiFi or a wired LAN connection.

Furthermore, the OST system can include a consumer camera, a checkout belt camera, an image analyzer, a retail activation system, and/or a coupon printer, alone or in any combination. The consumer camera (e.g., 10-megapixel CCD camera) produces photographs of consumer interactions with the merchandising unit. The checkout belt camera (e.g., 10-megapixel CCD camera) produces photographs of a consumer's entire set of purchases. The Image analyzer generates biometrics from consumer camera data, which can include gender, age, height, and weight. The image analyzer can also, from the checkout belt camera, automatically detect some or all items in a shopper's purchase. The retail activation system can activate the aforementioned sensors in response to consumer presence or interaction with the display shelf of the merchandising fixture. The coupon printer can print coupons on demand from a coupon repository, such as a coupon database.

In some embodiments, some of the above-mentioned cameras, with a frame grabber, can collect images that are either analyzed immediately by an image analyzer or subsequently analyzed by a backend process (e.g., an off-shore service center performing visual inspection of each frame to identify biometric information, such as, a consumer's physical characteristics, that in turn can be used to derive demographic information about consumers in relation to a particular product). The camera of the OST system can be located above a checkout aisle conveyer belt, where the camera can capture the product items placed on the belt and store such information as an inventory zone event for processing by the OST system. In real time, before and/or regardless of whether the consumer completes a checkout transaction, the OST system can trigger either an audio advertisement played through an audio system coupled to the OST system or a multimedia advertisement displayed on a graphical display coupled to the OST system. The OST system can trigger the advertisements based on product items captured by the camera or biometrics of the consumer in order to test or improve productivity of a retail location. Further, when an inventory zone event has occurred, the OST system can trigger either an audio advertisement played through a speaker coupled to the OST system or multimedia advertisement displayed on a graphical display coupled to the OST system. This is done for the consumer at the merchandising fixture, based on the product items identified by the inventory zone event.

FIG. 1 illustrates example components of an example OST system 100. The OST system tracks consumer activity in relation to retail product units (e.g., unit 102a, and unit 102b) from a retail carton 104, while the retail carton 104 is positioned on an inventory zone of sensors (e.g., 106a, 106b, 106c, 106d, and 106e) mounted on a retail display shelf 108 of a merchandising fixture 110. The OST system includes a mounting system (including parts, e.g., parts 112a, 112b, and 112c) used to physically position the product sensors (e.g., 114a and 114b) securely to the merchandising fixture 110 relative to the retail carton 104 and the merchandising fixture 110, in order to maximize the repeatability and reproducibility of product measurements by the OST system. The mounting system can be implemented, for example, as a metal tray that is custom fitted to the edges of the retail carton 104 with FSRs with a spacer adhered to the top of the FSRs, a peg hook pivot, and/or a flexible mat with hexagonal array of sensors. The inventory zone (e.g., 106a, 106b, 106c, 106d, and 106e) refers to a group of product sensors assigned to one retail carton 104 (e.g., an inventory zone implemented as a flexible mat with a rectangular array of sensors). The OST system uses product sensors to provide a way to determine when a consumer interacts with a retail product unit positioned on the retail shelf 108. From this interaction, a description of the interaction is generated and stored as an event in an event log for later retrieval and analysis. The retail product unit is the smallest increment of retail product offered by a retailer for purchase (e.g., a single pack of Wrigley® Five Rain gum, 15 sticks). The retail carton 104, also referred to as a product container, contains retail product units in a standard number and configuration (e.g., 10 ct box of Wrigley® Five Rain gum). The merchandising fixture 110 displays retail products to consumers in an appealing fashion. Example merchandising fixtures include a checkout shelf, a peg hook, an aisle shelf, a temporary cardboard display and a drink bin. The product sensors convert the amount of product in the retail carton 104 into a proportionate electromagnetic property. Example product sensors that can be implemented, alone or in various combinations, include a force sensitive resistor (FSR) sensor positioned underneath a retail carton, an ultrasonic probe positioned over the top of a retail carton, a capacitance sensor underneath a retail carton, a CCD camera and image analyzer, or any other type of sensor now known or later developed that can convert a sensed amount of product in a retail carton into a proportionate electromagnetic property.

Figure 2:
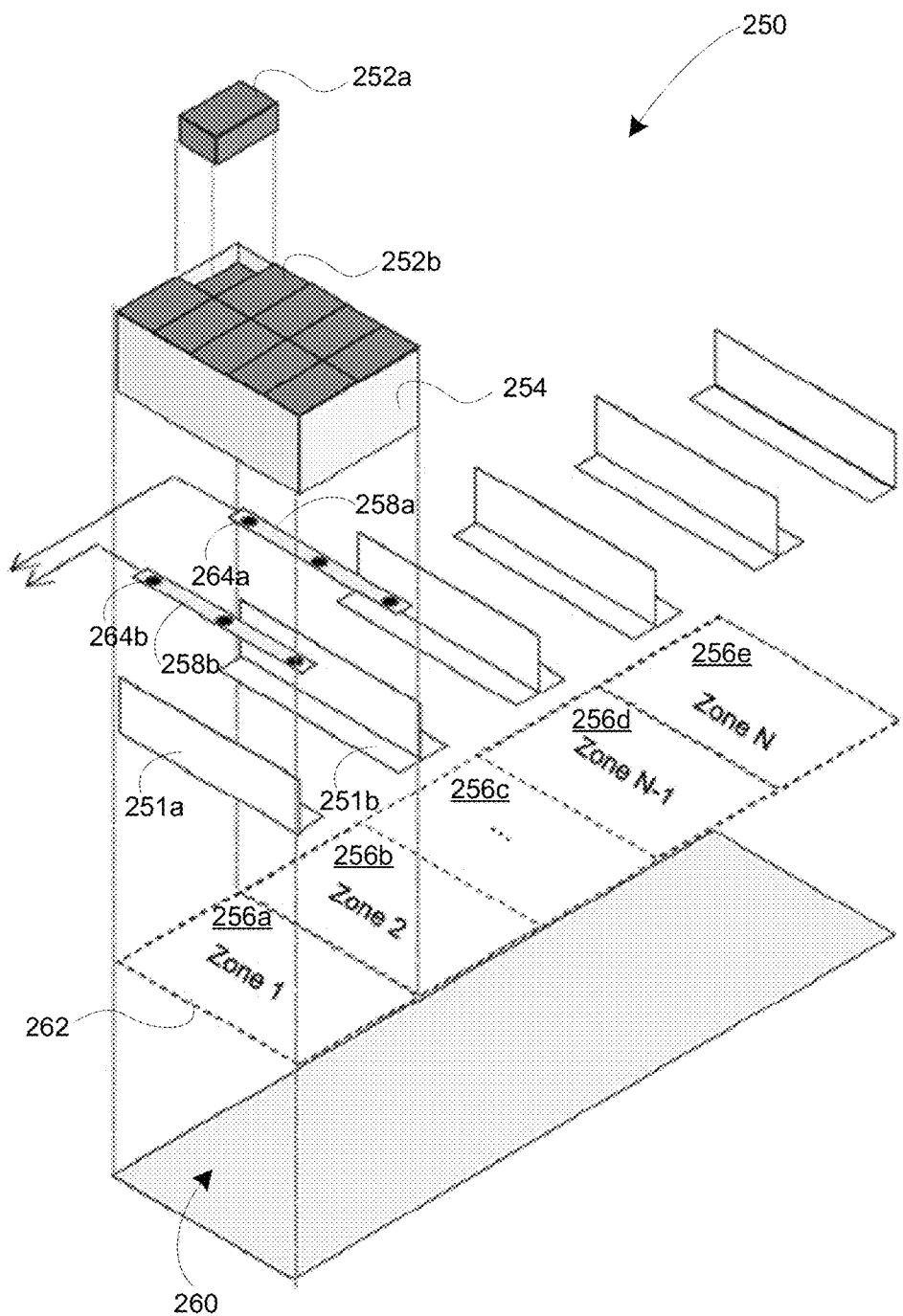
FIG. 2 illustrates example components of another example OST system.

FIG. 2 illustrates example components of another example OST system 250 that can implement a sliding track for adjusting, for example, dividers 251a and 251b for securing products 252a and 252b and a product container 254. These components can be installed on a merchandising unit, and can facilitate designing one or more inventory zones, such as zones 256a, 256b, 256c, 256d, and 256e, where within the inventory zones, the inventory zones present one or more units of product in one or more of the following arrangements: (i) the one or more units of product arranged in a container in a geometric pattern of one or more layers deep, and/or (ii) the one or more units of product arranged loosely in a container. Also depicted, are product sensors, such as 258a and 258b, each at least associated operatively with one of the one or more inventory zones that convert a sensed quantity of the one or more units of product into a respective analog electromagnetic signal. Generally depicted, is a mounting structure 260 that secures the one or more product sensors to the merchandising unit relative to the one or more units of product so that the one or more product sensors sense a quantity of the one or more units of product. Also depicted is a shelf 262 of the mounting structure that supports the aforementioned components. Further, depicted are actuators, or parts that focus the weight of products at predetermined points of the product sensors, e.g., actuators 264a and 264b.

With reference to FIGS. 3-7, and as suggested above, the mounting structure can be modular, and positioning of the one or more product sensors or corresponding circuits includes arranging the one or more product sensors or the corresponding circuits in parallel strips at or abutting dividers. The dividers significantly increase the accuracy of measurement by maintaining load in a fixed position relative to the product sensors. Without the dividers, product would move laterally relative to the product sensors as a result of normal consumer activity, and such would produce significant numbers of false readings. Also, these dividers can be T and/or L dividers, e.g., L divider 376a and T divider 376b, connected to the mounting structure or a part of the mounting structure, e.g., a part of a mounting system such as the mounting structure 260, such as a shelf, frame, or track, e.g., a slide track 377. The one or more product sensors (e.g., sensors 378a, 378b, and 378c) may include actuators (e.g., actuators 380a and 380b) and are attached on an upward facing surface of the mounting structure or the dividers, so as to align the one or more sensors to contact a fixed and reproducible location on an underside of the one or more units of product, e.g., units of product 482 and 484, or a container, e.g. container 486, holding the one or more units of product.

Figure 3:
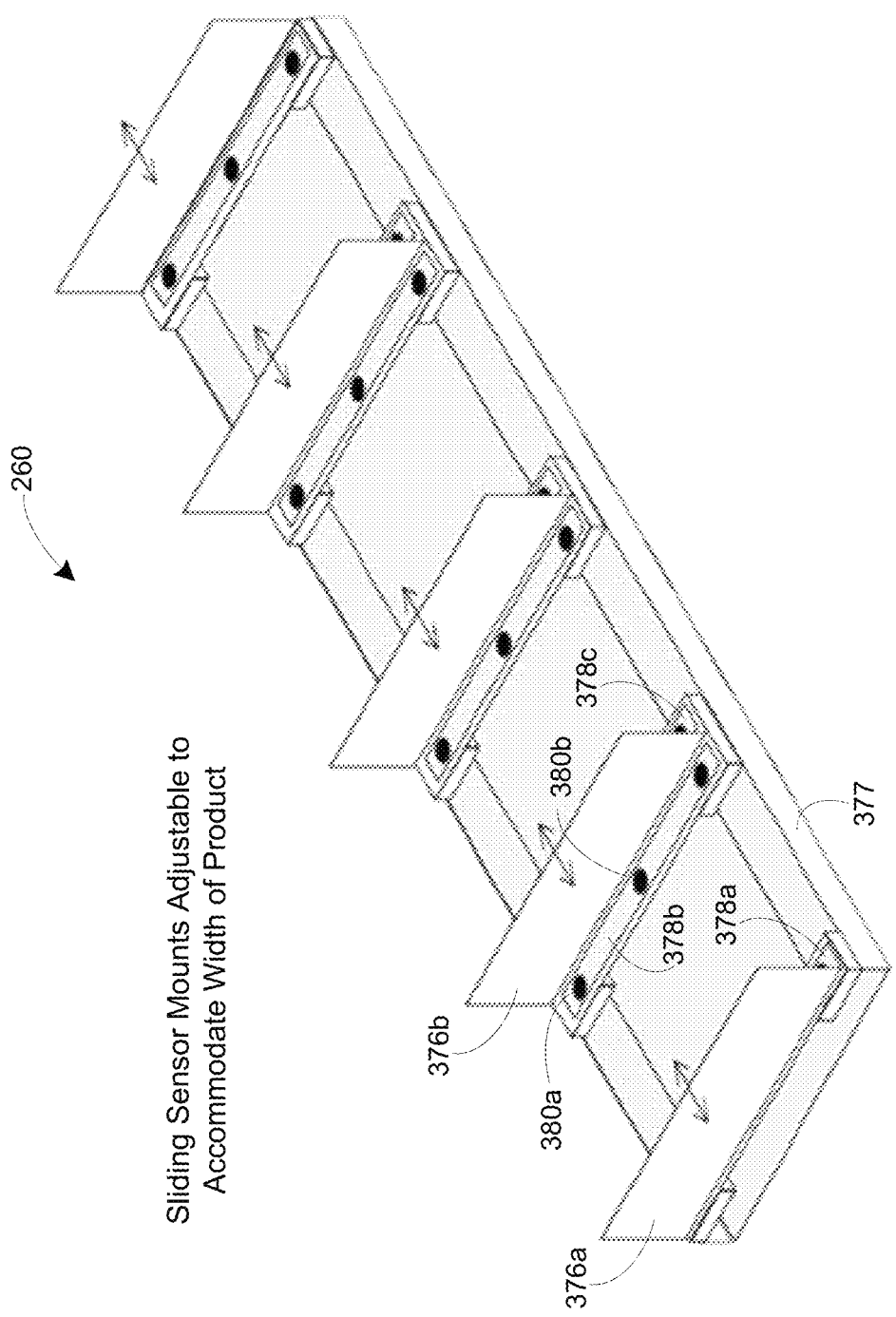
FIG. 3 illustrates example sliding sensor mounts adjustable to accommodate product containers of various sizes.
Figure 4:
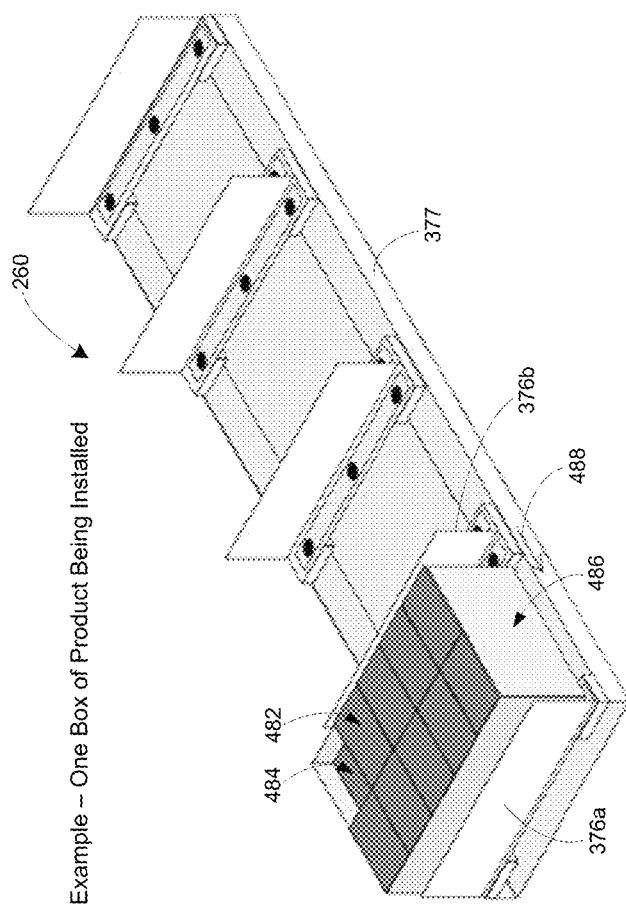
FIG. 4 illustrates the sliding sensor mounts of FIG. 3 adjusting to fit an example product container.
Figure 5:
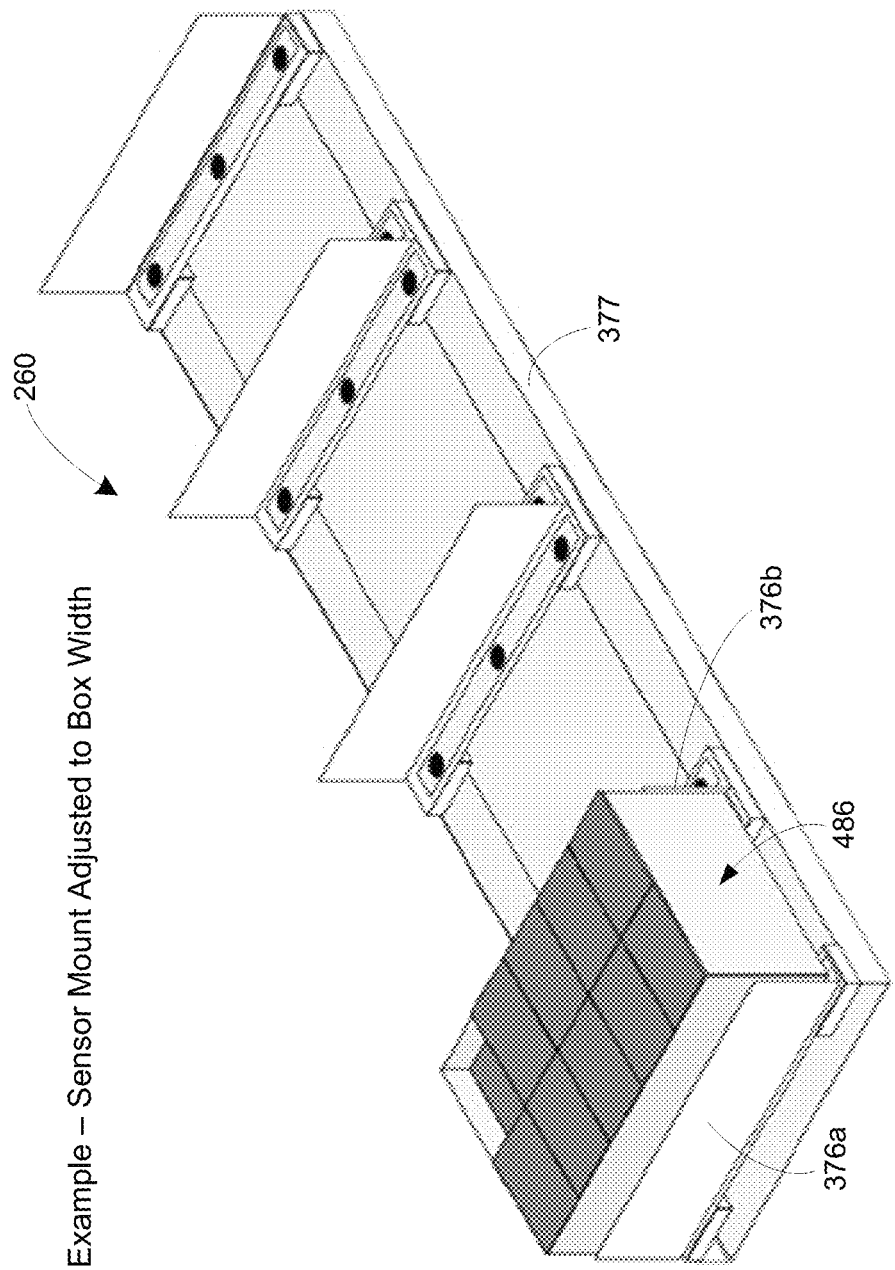
FIG. 5 illustrates the sliding sensor mounts of FIG. 3 adjusted to fit the example product container of FIG. 4.
Figure 6:
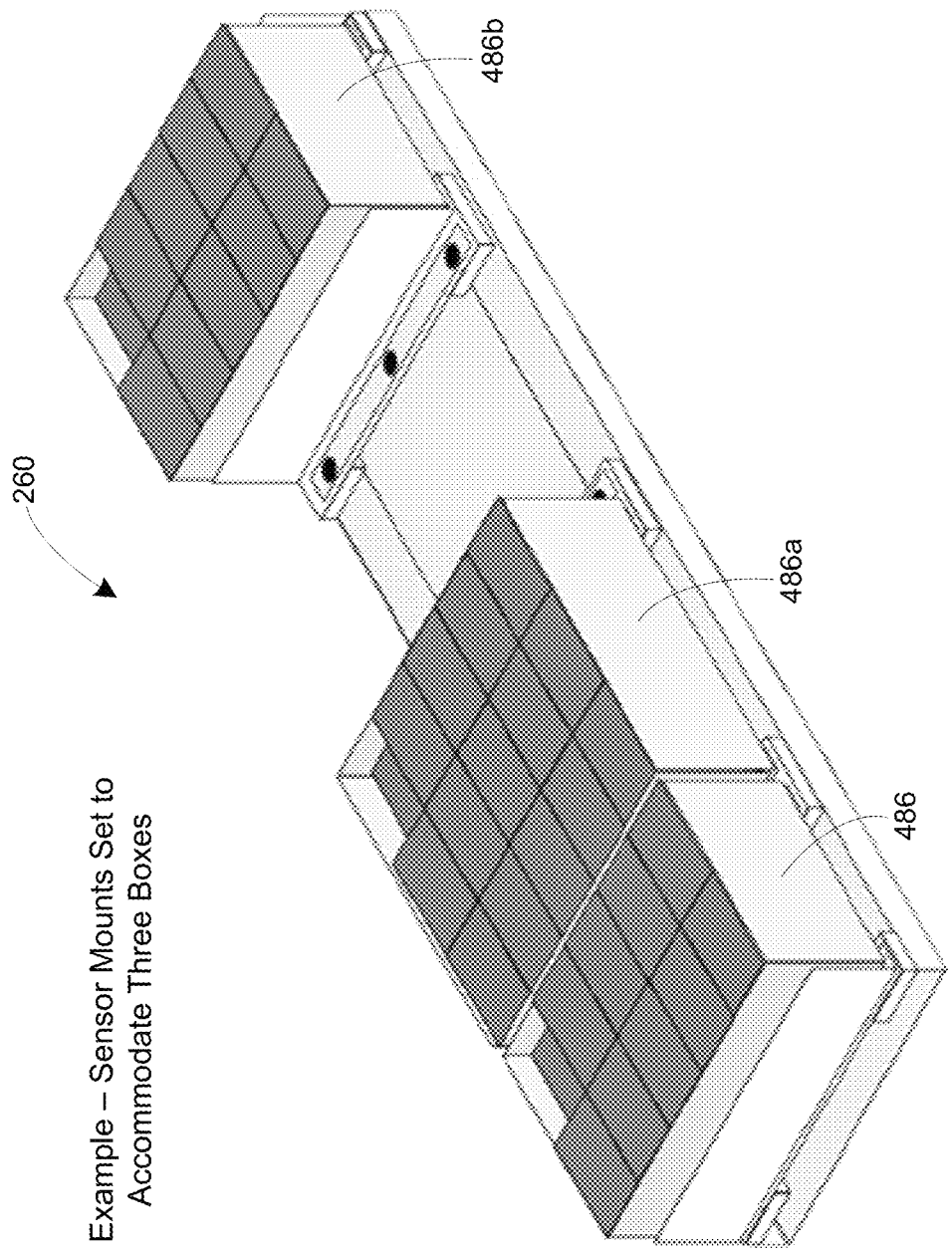
FIG. 6 illustrates the sliding sensor mounts of FIG. 3 adjusted to fit multiple product containers, including the product container of FIG. 4.
Figure 7:
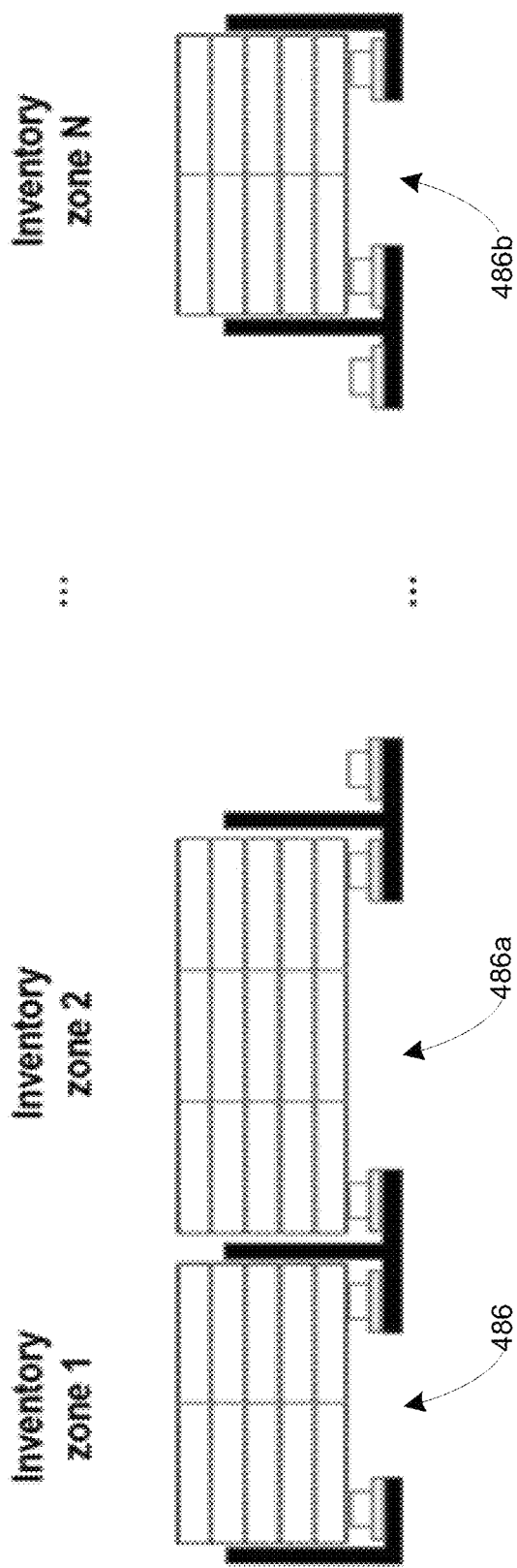
FIG. 7 illustrates a side view of the sliding sensor mounts of FIG. 3 adjusted to fit multiple product containers, including the product containers of FIG. 6.

Further, the mounting structure is adjustable to accommodate any width of the one or more units of product or the container holding such products. For example, FIG. 3 illustrates example sliding sensor mounts/dividers adjustable to accommodate product containers of various sizes (where the double arrows depict direction in which the mounts/dividers can be adjusted). FIG. 4 illustrates the sliding sensor mount/divider 376b adjusting/sliding (depicted by and arrow 488) to accommodate the product container 486. FIG. 5 illustrates the sliding sensor mounts of FIG. 3 adjusted to fit the example product container 486. FIG. 6 illustrates the sliding sensor mounts of FIG. 3 adjusted to fit multiple product containers, including the product container 486 and containers 486a and 486b. FIG. 7 illustrates a side view of the sliding sensor mounts of FIG. 3 adjusted to fit multiple product containers, including the product containers of FIG. 6.

Figure 8:
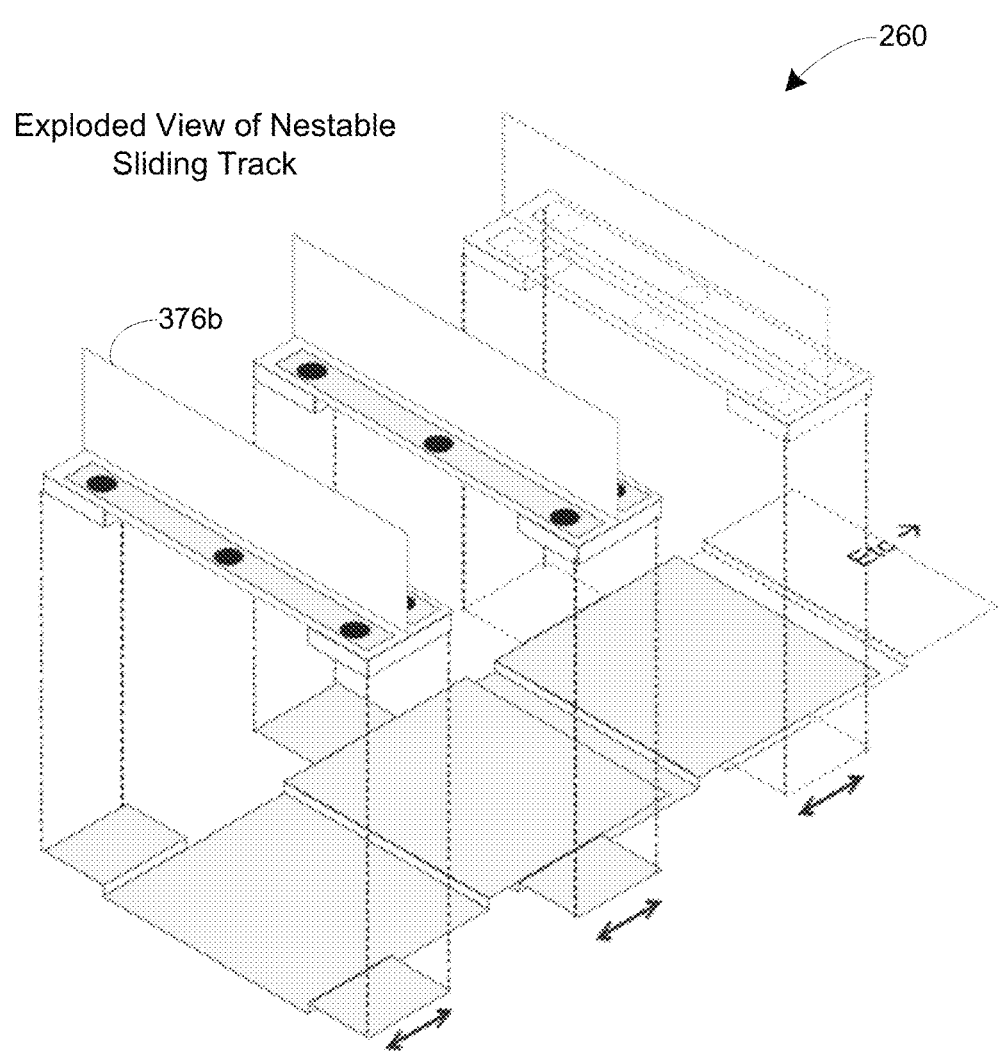
FIG. 8 illustrates an exploded view of the sliding sensor mounts of FIG. 3.

Further, mounting structures can include a sliding track that facilitates adjusting the position of the T or the L dividers on the sliding track, where the sliding track is readily fastened and unfastened from the mounting structure without hardware tools. Also, the adjusting the position of the T or L dividers can be readily done without hardware tools. Furthermore, the sliding track can be configured to form a channel, where the channel is manufacturable to fit any size shelf. Also, the wires associated with the one or more sensors can run within the channel so to conceal the wires. Further, the wires can terminate at a connector on one edge of the mounting structure from where the wires are further wired to the electromagnetic signal processor. Also, the one or more product sensors can be fixed to respective parts of the sliding track that allow for adjusting a respective position of the one or more product sensors. Furthermore, to enhance the modularity of the sliding track, the dividers can be readily attached and detached from a corresponding part of the track (See FIG. 8). Also, for example, sections of track can nest within each other so as to provide a track that is adjustable to accommodate different facing widths and is extensible in overall width.

Figure 9:
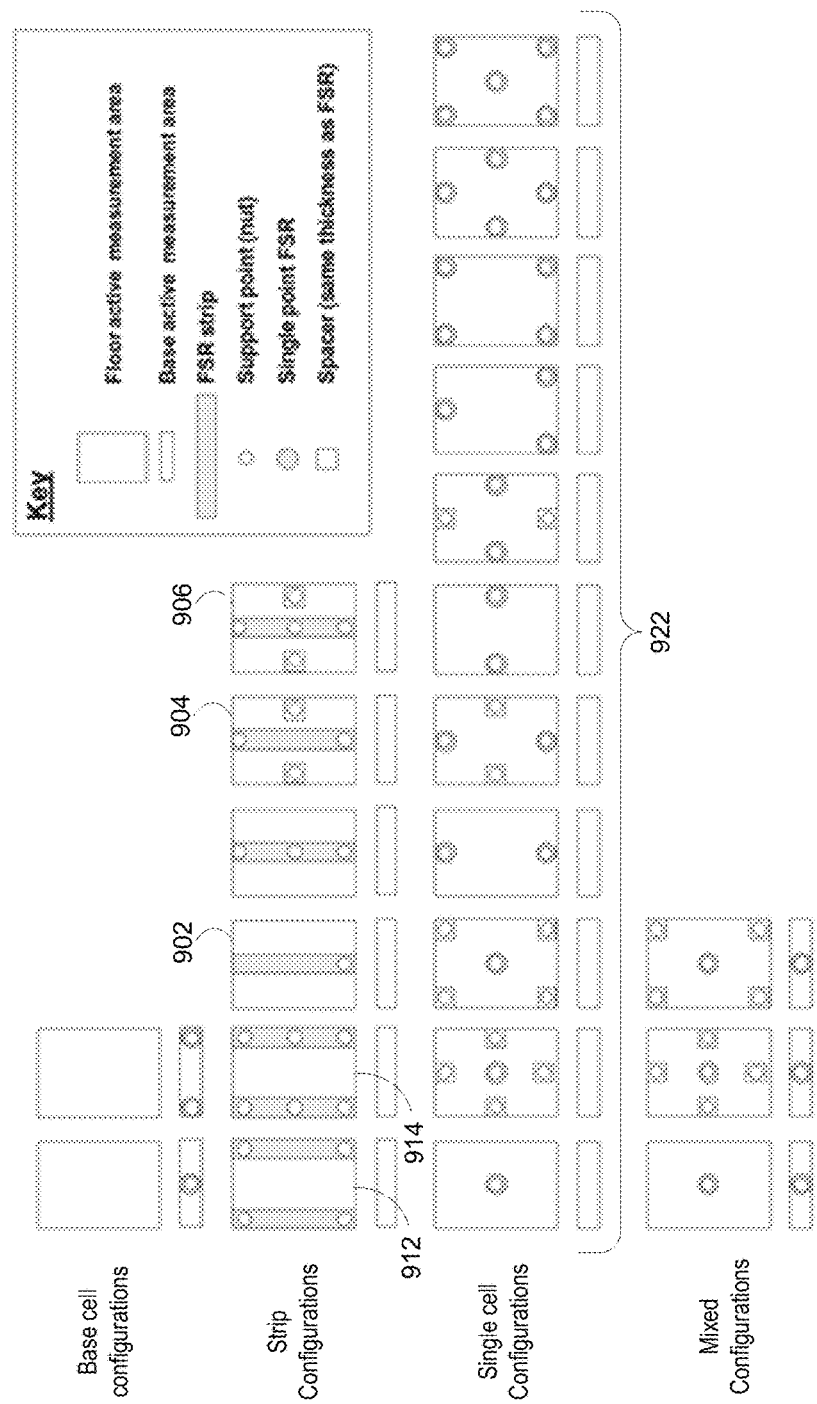
FIG. 9 illustrates various examples of inventory zones implemented with various sensor arrangements.

Due to the modularity of the sliding track, and the OST system in general, the inventory zones can be arranged in various manners. For example, FIG. 9 illustrates various examples of inventory zones implemented with various sensor arrangements in floor and base active measurement areas. The sensor circuits can be arranged on the inventory zone in a single strip parallel to the left and right rear display surface edges (e.g., configurations 902, 904, 906). Alternatively, the sensor circuits can be arranged on the inventory zone in multiple parallel strips in parallel to the left and right display surface edges (e.g., configurations 912, 914), or can be arranged in a wide variety of two dimensional arrangements of button cells (e.g., on of configurations 922). Different arrangements can be selected to optimize measurement accuracy for different types of product. These arrangements are not limited to those shown in FIG. 9.

Figure 10:
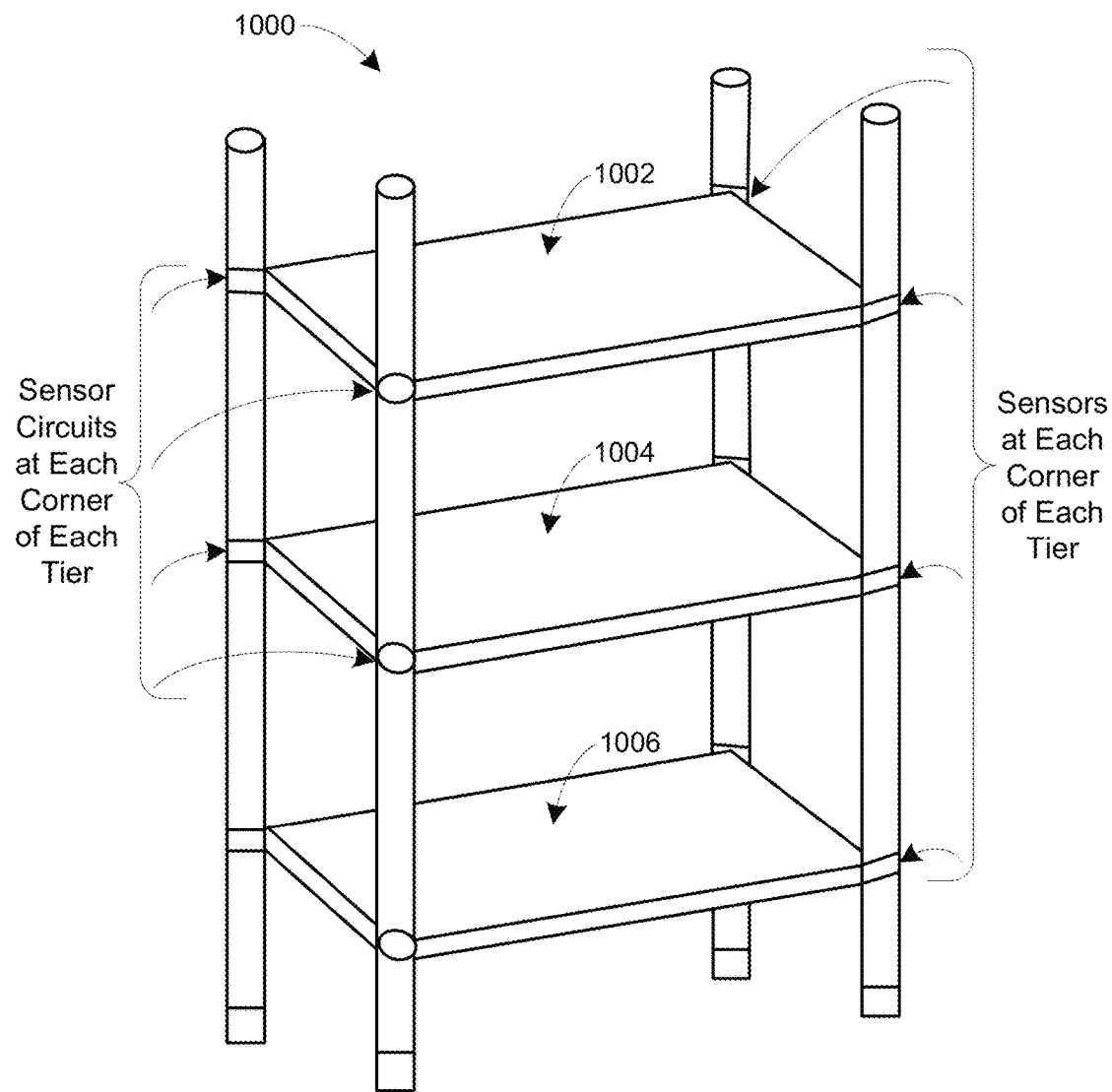
FIG. 10 illustrates an example of an inventory zone with sensor circuits positioned at the corners of each shelf tier.

FIG. 9 depicts a top view of various example arrangements of the inventory zones. With respect to FIGS. 10 and 11, a side perspective of some example arrangements is depicted. Specifically, FIG. 10 illustrates an example of an inventory zone 1000 with sensor circuits positioned at the corners of each shelf tier 1002, 1004, and 1006, each comprising several inventory zones. As mentioned above, a display rack with multiple display surface shelves can be configured to include inventory zones each corresponding to one display surface shelf, where sensor circuits for each inventory zone are positioned at the corners of each inventory zone so that the set of sensor circuits positioned on a particular display surface shelf of the rack measure activity for that display surface shelf.

Figure 11:
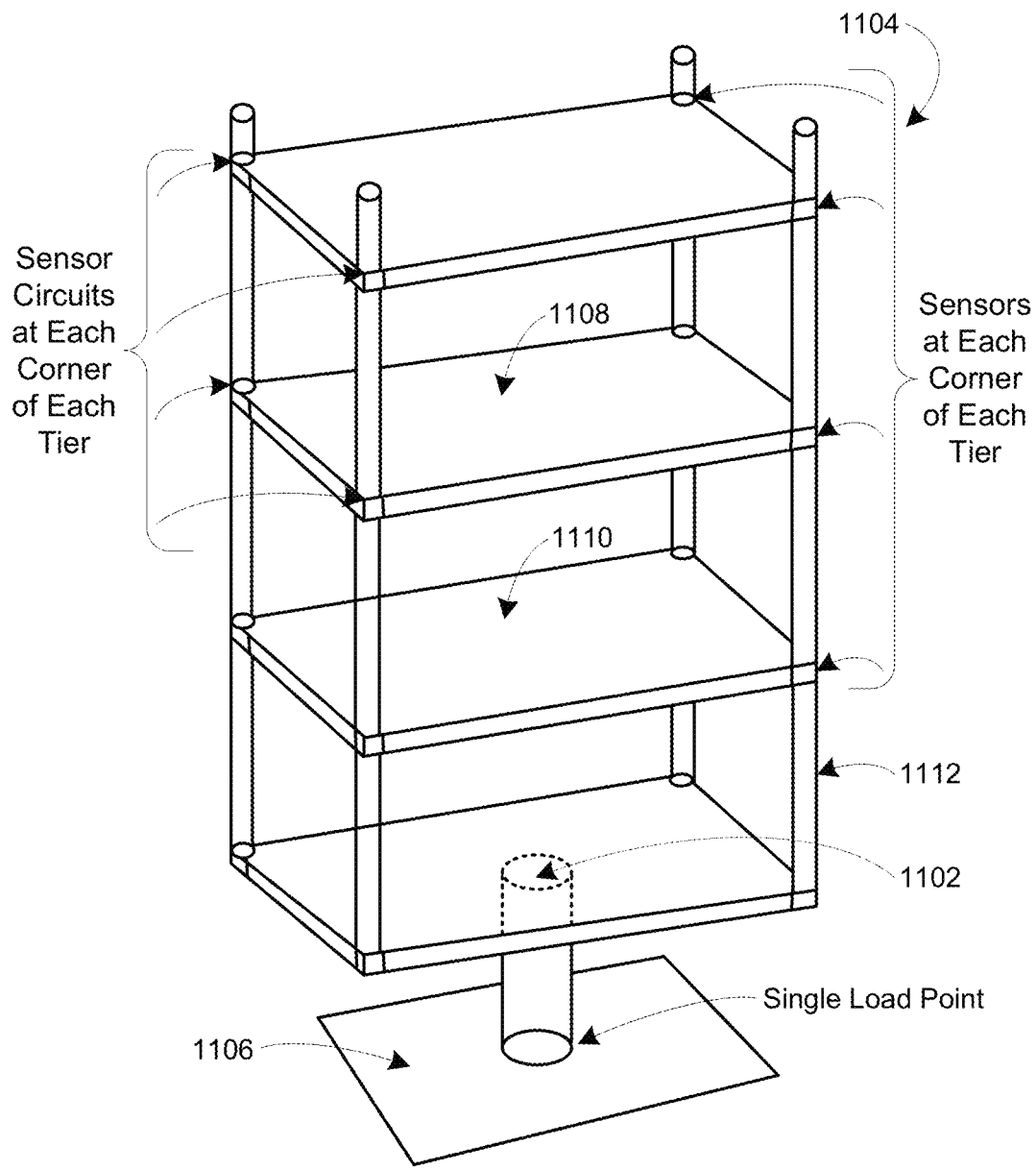
FIG. 11 illustrates an example of an inventory zone with a sensor underneath a merchandising display fixture.

FIG. 11 illustrates an example of an inventory zone with a sensor 1102 underneath a merchandising display rack 1104. A base 1106 of the rack can also be positioned on a sensor or set of sensors so that the entire display is monitored as a whole. The merchandising display rack 1104 can also include display bins or shelves (e.g., 1108, 1110) positioned on mounting system 1112 or a mounting system built into the bin so that the OST system logs an event when an item is removed or returned to the display bin or shelf. Sensors can also be positioned at each corner of each of the shelves of the display rack 1104.

Figure 12:
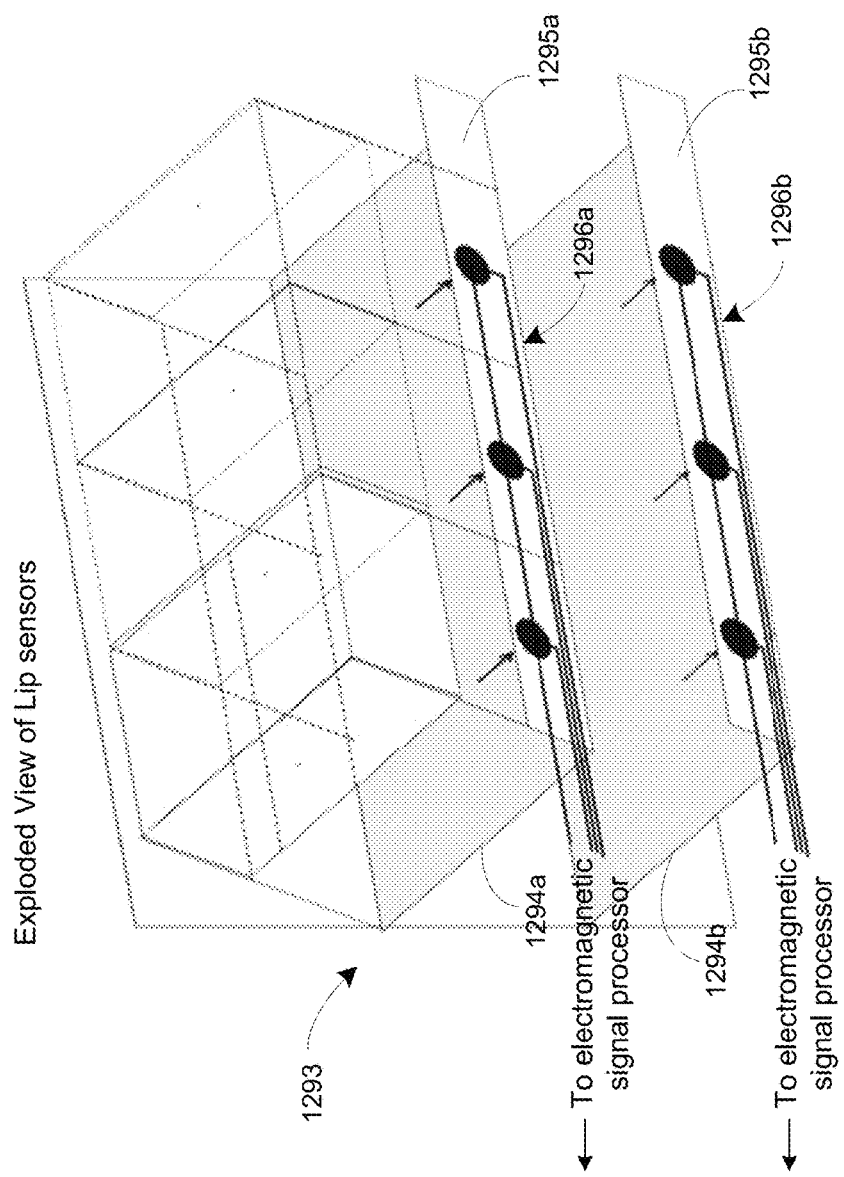
FIG. 12 illustrates a front perspective of an example product sensor mount having display surface edge lips.

Also, as shown in FIG. 12, a mounting system 1293 of the product sensors 1296a and 1296b can position the product sensors on display surface edge lips 1295a and 1295b perpendicular to display surfaces 1294a and 1294b, respectively. In such embodiments, an angle of tilt of the display surface can exceed a configurable display surface tilt angle threshold. This threshold can be an amount of tilt that is required for the sensors 1296a and 1296b to sense the weight of a product placed on the lips 1295a and 1295b.

Figure 13:
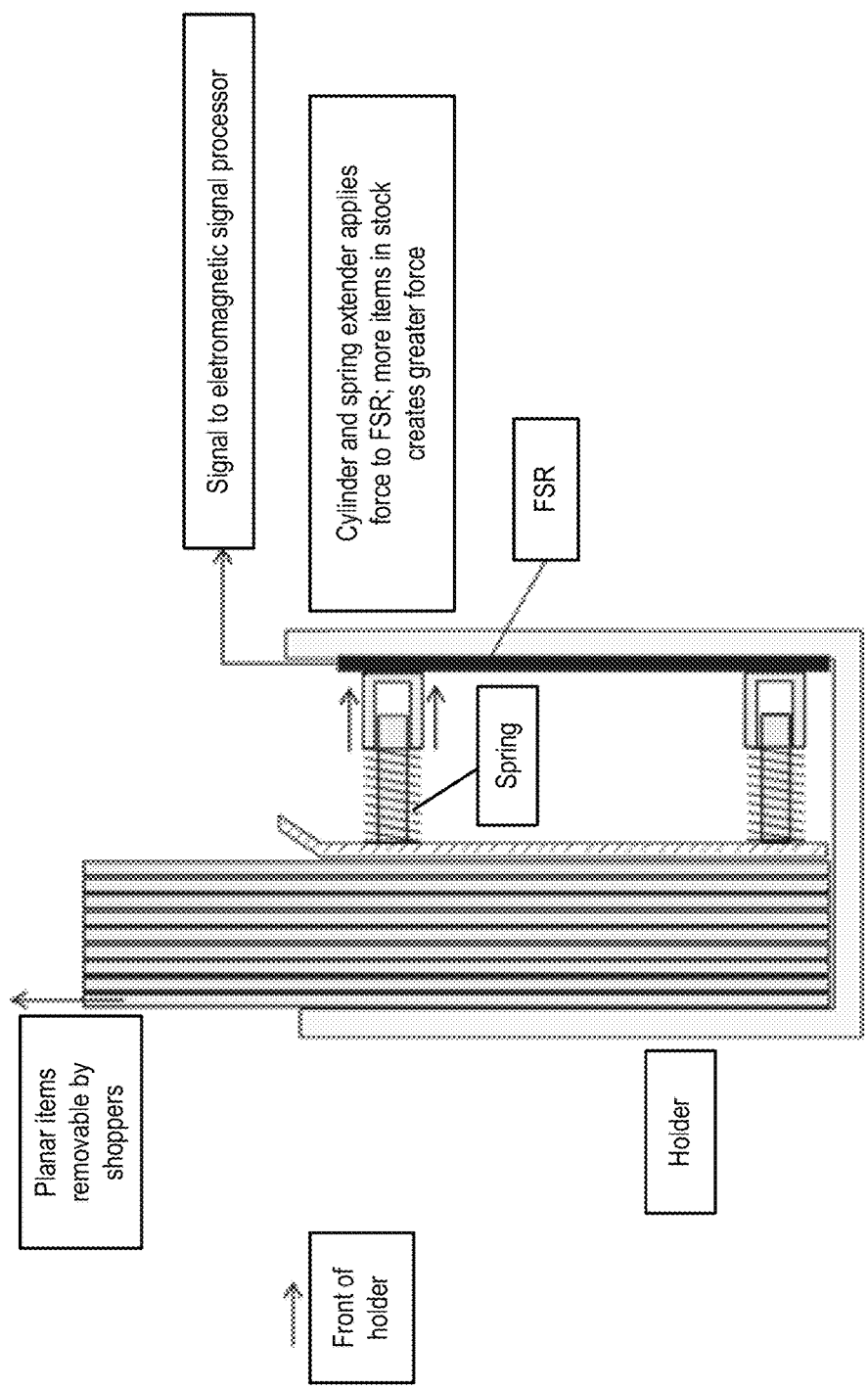
FIG. 13 illustrates a side view of an example spring-loaded pickup sensor for flat and lightweight items.

Further, in some embodiments, the OST system can include one or more product sensors connected to springs or integrated with springs to detect removal or addition of a lightweight product. Such lightweight products can include leaflets, business cards, or any other lightweight products. See FIG. 13 for an implementation of such spring-loaded product sensors.

Also, in some embodiments, the one or more product sensors can include one or more of piezoelectric sensors, pressure sensors, and force sensing resistors. Each of these types of sensors can be enhanced by one or more raised actuators concentrating load of one or more units of product onto a load sensitive part of the one or more product sensors. Such actuators, for example, are depicted in FIGS. 3-7 (e.g., actuators 380a and 380b).

Further, in some embodiments, the one or more sensors can be arranged to cover an entire area of a shelf of the merchandising unit, and a respective circuit of each of the one or more sensors is one or more of the following circuit shapes: a honeycomb circuit shape, a square circuit shape, and a round circuit shape. In such embodiments, the mounting structure can be a flexible printed circuit board that can be rolled out into place on a display surface of the merchandising unit.

Figure 14:
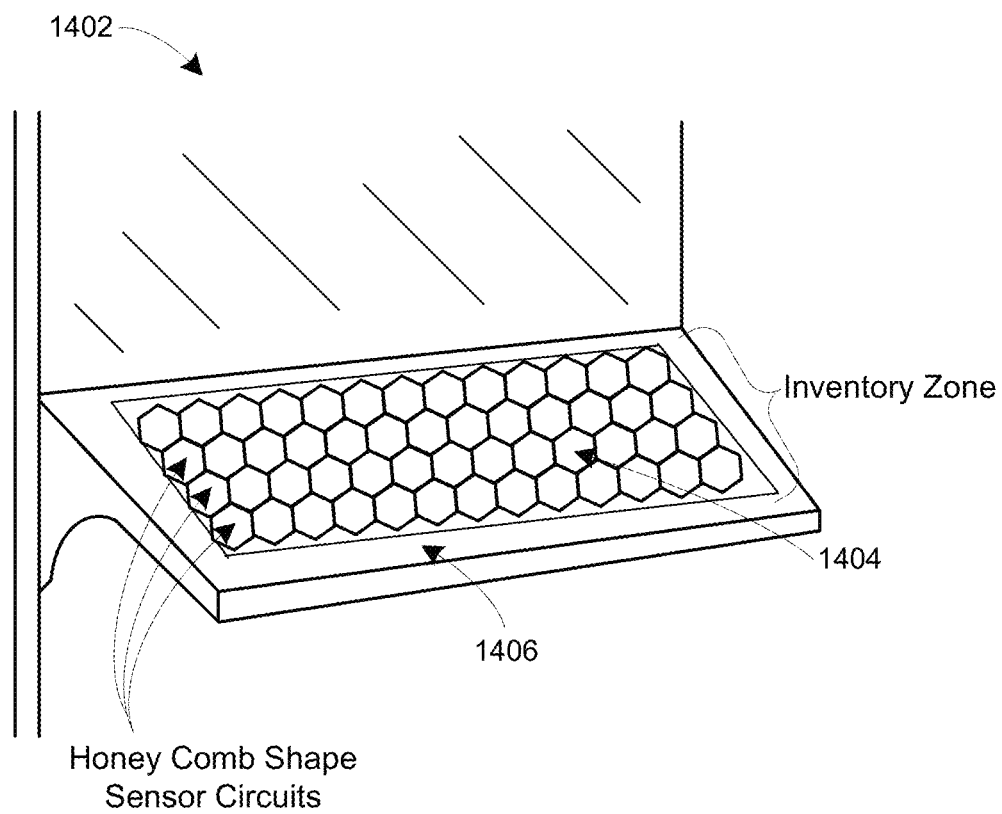
FIG. 14 illustrates an example of an inventory zone with a set of sensor circuits arranged on the inventory zone in a hexagonal array.

FIG. 14 illustrates an example of a mounting system 1402 with a set of sensor circuits in a hexagonal configuration 1404, which can be arranged on a flexible substrate. The sensor circuits can be in a honeycomb configuration arranged on the shelf 1406 to cover the entire area of shelf and configured into multiple inventory zones.

Figure 15:
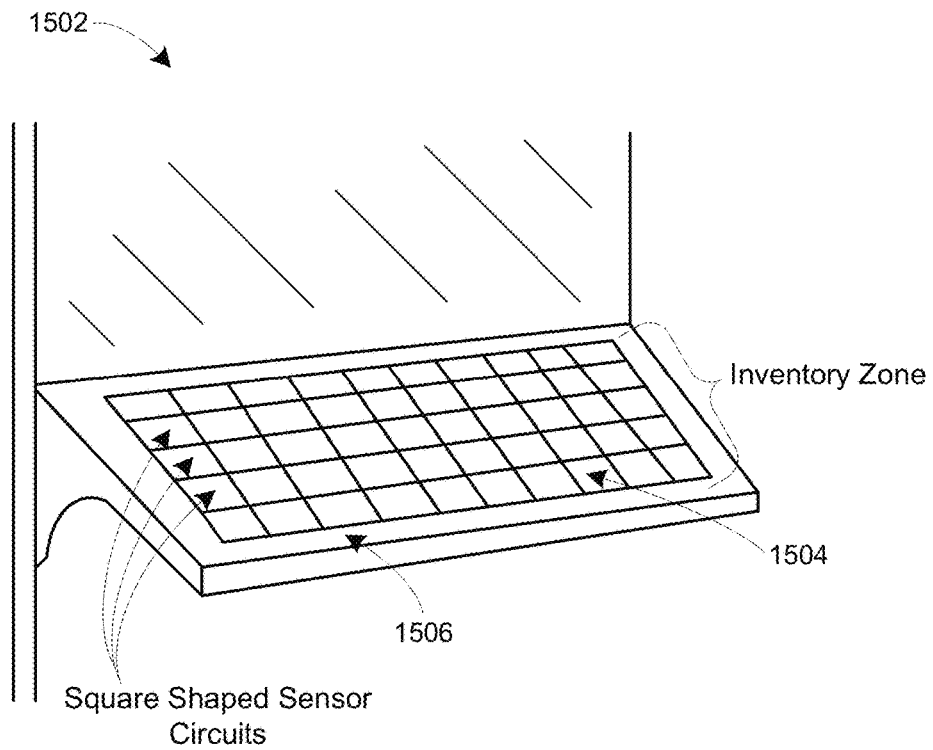
FIG. 15 illustrates an example of an inventory zone with a set of sensor circuits arranged in a square or rectangular array.

FIG. 15 illustrates an example of a mounting system 1502 with a set of sensor circuits in a square configuration 1504, which can be arranged on a flexible substrate. The sensor circuits can be in a square configuration arranged on the shelf to cover the entire area of shelf 1506 and can be configured into multiple inventory zones.

Figure 16:
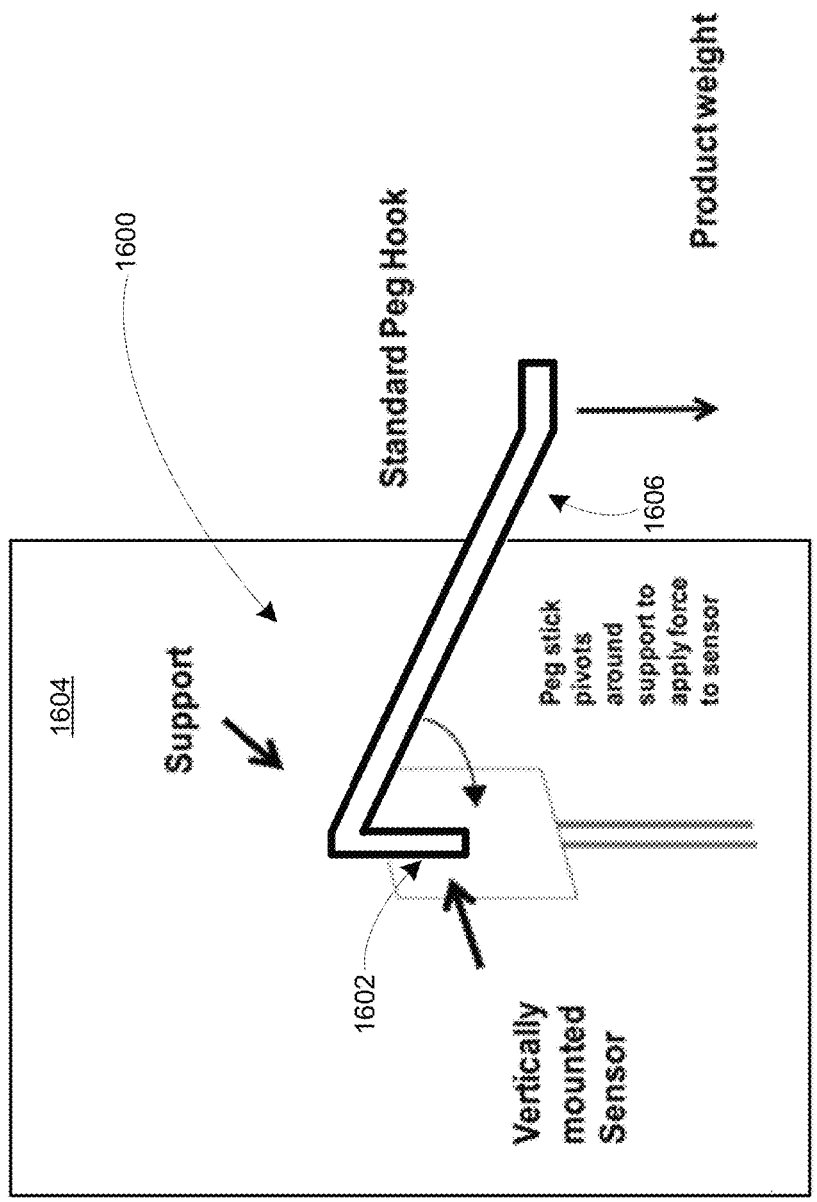
FIG. 16 illustrates an example of an inventory zone with sensor circuits positioned on a peg wall with a hook fixture.
Figure 17:
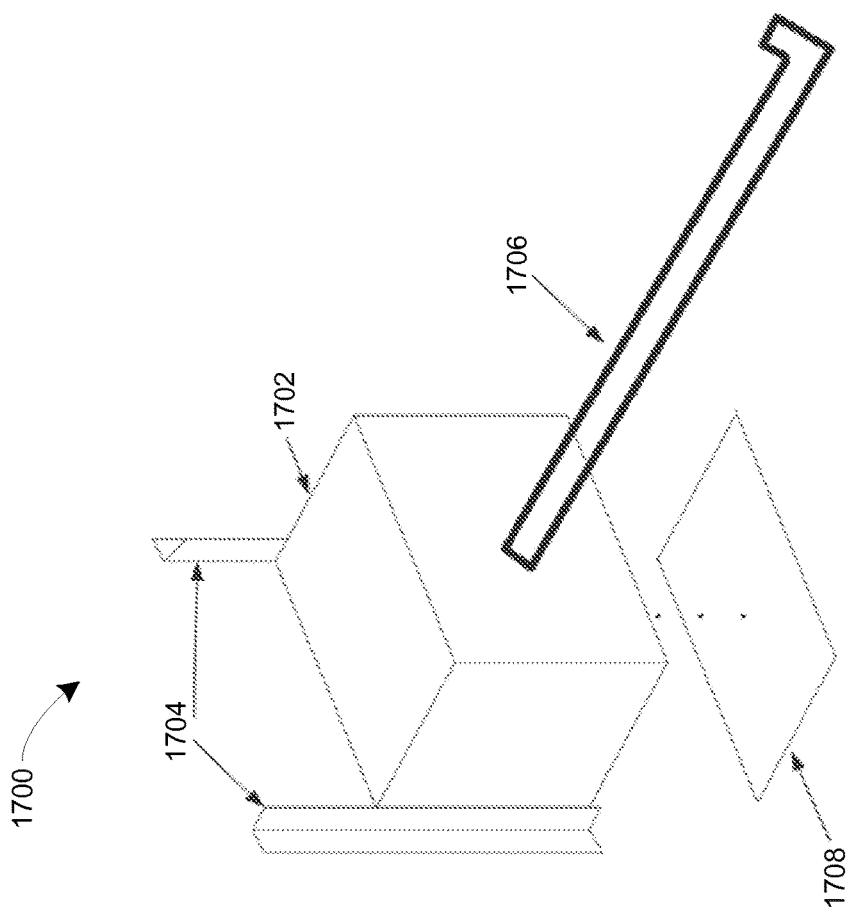
FIG. 17 illustrates an example of an inventory zone with sensor circuits positioned below a mounting block.

Furthermore, besides utilizing shelving, the merchandising fixture or unit can display retail products to consumers via peg hooks or other known structures for displaying merchandise. For example, FIG. 16 illustrates an example of an inventory zone 1600 with sensor circuit 1602 positioned on a peg wall 1604 with hook fixture 1606. The sensor circuit 1602 measures a compression force from the movement created by the product's weight, from the fixture 1606 to the peg wall 1604. FIG. 17 illustrates an example of an inventory zone 2900 with a sensor circuit 2902 positioned below a mounting block 1702. The mounting block 1702 can be configured to move along vertical tracks 1704 with a peg 1706 for hanging products. In some embodiments, the mounting block 1702 can rest on top of the sensor 1708 at the bottom of the tracks 1704, where the block 1702 is mounted horizontally. This configuration allows downward force to be measured. The mounting block and peg wall arrangements can be employed to display non-boxed product items that are intended to be displayed by hanging the product items. In such embodiments, the one or more product sensors can be mounted at a support point of the peg hook so that as load is applied to the peg hook the load is transmitted to the one or more product sensors.

Figure 18:
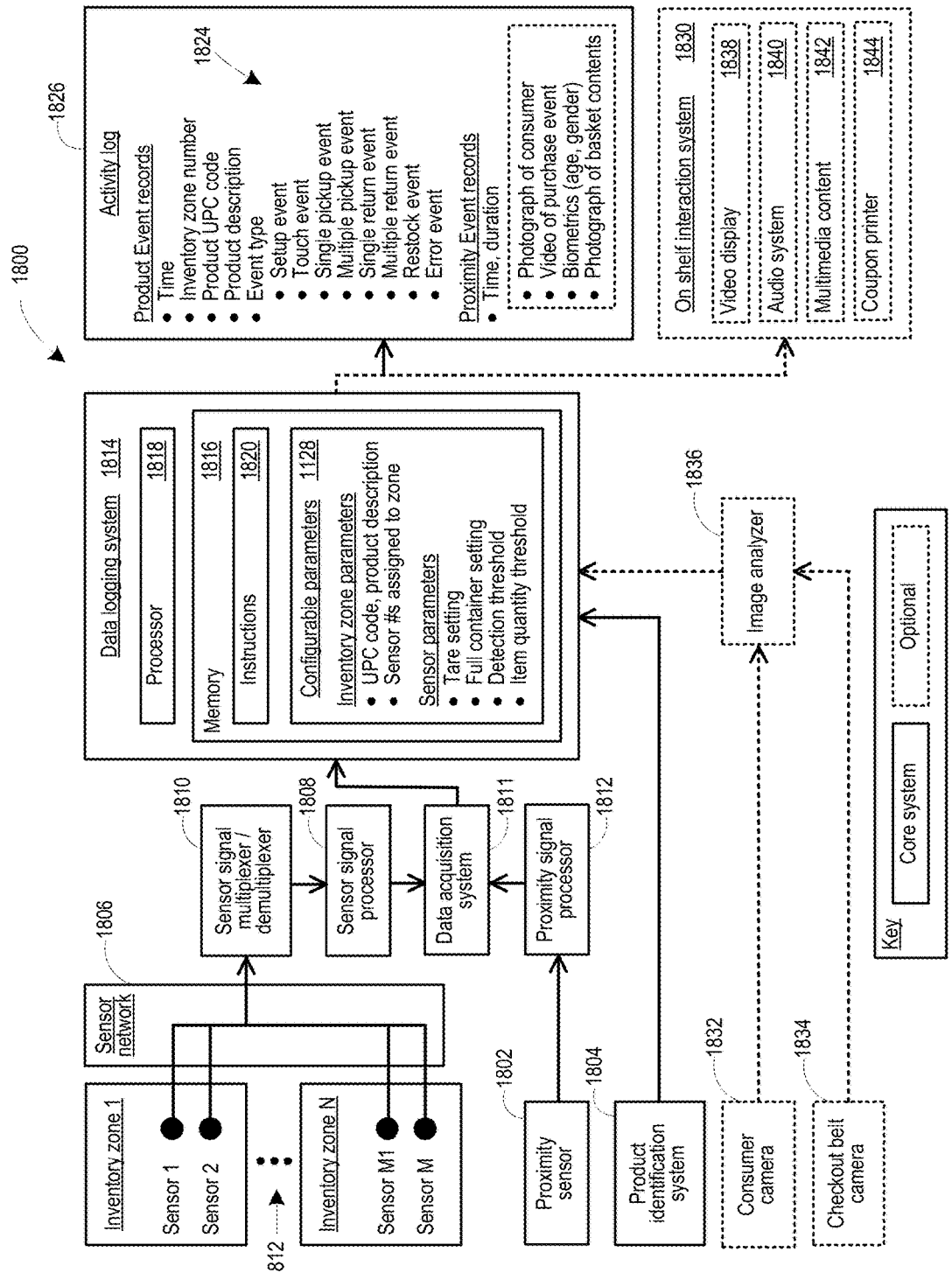
FIG. 18 illustrates a block diagram of an example of an OST system.

With respect to combining the other components of the OST system with the product sensor arrangements and mounting systems, FIG. 18 illustrates a block diagram an example of an OST system 1800. In addition to the OST system described in FIG. 1, the OST system 1800 includes a proximity sensor 1802 and a product identity system 1804. The proximity sensor 1802 detects the presence of actual and potential customers within a configurable proximity of the merchandising unit. The proximity sensor can be implemented as an ultrasonic distance sensor, an infrared motion sensor or any other proximity sensor now known or developed in the future that detects the presence of actual and potential customers within a configurable proximity of the merchandising unit. A sensor network 1806 communicates or transfers the signals from the sensors to a sensor signal processor 1808. The sensor network 1806 can be implemented either with wiring or through a wireless network, or any other sensor network now known or developed in the future. A sensor signal multiplexer and demultiplexer 1810 facilitates communication or transfer of signals from multiple sensors (e.g., sensors 1812) through a minimum number of wires and bandwidth. A Texas Instruments® CD74HC4051-EP analog multiplexer/demultiplexer can be used as the sensor signal multiplexer and demultiplexer 1810. The sensor signal processor 1808 converts the electromagnetic signal outputted by the sensor into a digitizable property or signal. The sensor signal processor 1808 can be implemented as an operational amplifier, a frequency encoder, or digital signal processor.

The OST system 1800, illustrated in FIG. 18, also includes a data acquisition system 1811, a proximity signal processor 1812, a data logging system 1814, memory 1816, a processor 1818 and OST system instructions 1820 executable by the processor 1818. The data acquisition system 1811 converts the digitizable properties or signal into a digital signal. The data acquisition system 1811 can be implemented using an analog-to-digital convertor, microcontroller, or computer. The proximity signal processor 1812 converts a proximity signal (e.g., ultrasonic signal, infrared signal) into a digitizable signal, and can be implemented using an analog-to-digital convertor, microcontroller, or computer. The data logging system 1814 converts the digital signal into activity logs 1824 and can be implemented using a computer or microcontroller. The processor 1818 of the OST system 1800 performs the data processing operations that produce the activity log 1826. The processor 1818 of the OST system 1800 can be implemented using a computer or microcontroller. The OST system instructions 1820 specify the operations that the processor 1818 can execute. The OST system instructions 1820 can include, as an example, code segments found in DAQDactory Express®, LabView®, MATLAB®, or Microcontroller code. The OST system 1800 includes configurable parameters 1828 that include calibration data for each sensor, sensor assignments, and product assignments to inventory zones. The OST system 1800 generates the activity logs 1824 that provide a permanent record of both product and proximity events at the merchandising fixture shelf. The activity log 1826 can be stored on a removable SD card, and/or stored in the memory of the data logging system, and can be communicated and/or downloaded periodically via WiFi.

Also, the OST system 1800 can include an on-shelf interaction system 1830 that includes a consumer camera 1832, checkout belt camera 1834, image analyzer 1836, a video display 1838, an audio system 1840, other multimedia components 1842, and a coupon printer 1844. The consumer camera 1832 (e.g., 10 megapixel CCD camera) produces photographs of consumer interactions with the merchandising unit. The checkout belt camera 1834 (e.g., 10 megapixel CCD camera) produces photographs of the consumer's entire set of purchases. The Image analyzer 1836 generates biometrics from consumer camera data, including gender, age, height, weight, and emotion, and can automatically detect certain items in the shoppers purchase. The on-shelf interaction system 1830 provides interactive advertising and promotions in response to consumer activity at a display shelf of the merchandising fixture. The coupon printer prints coupons on demand in response to electromagnetic signals communicated from the OST system 1800.

Figure 19:
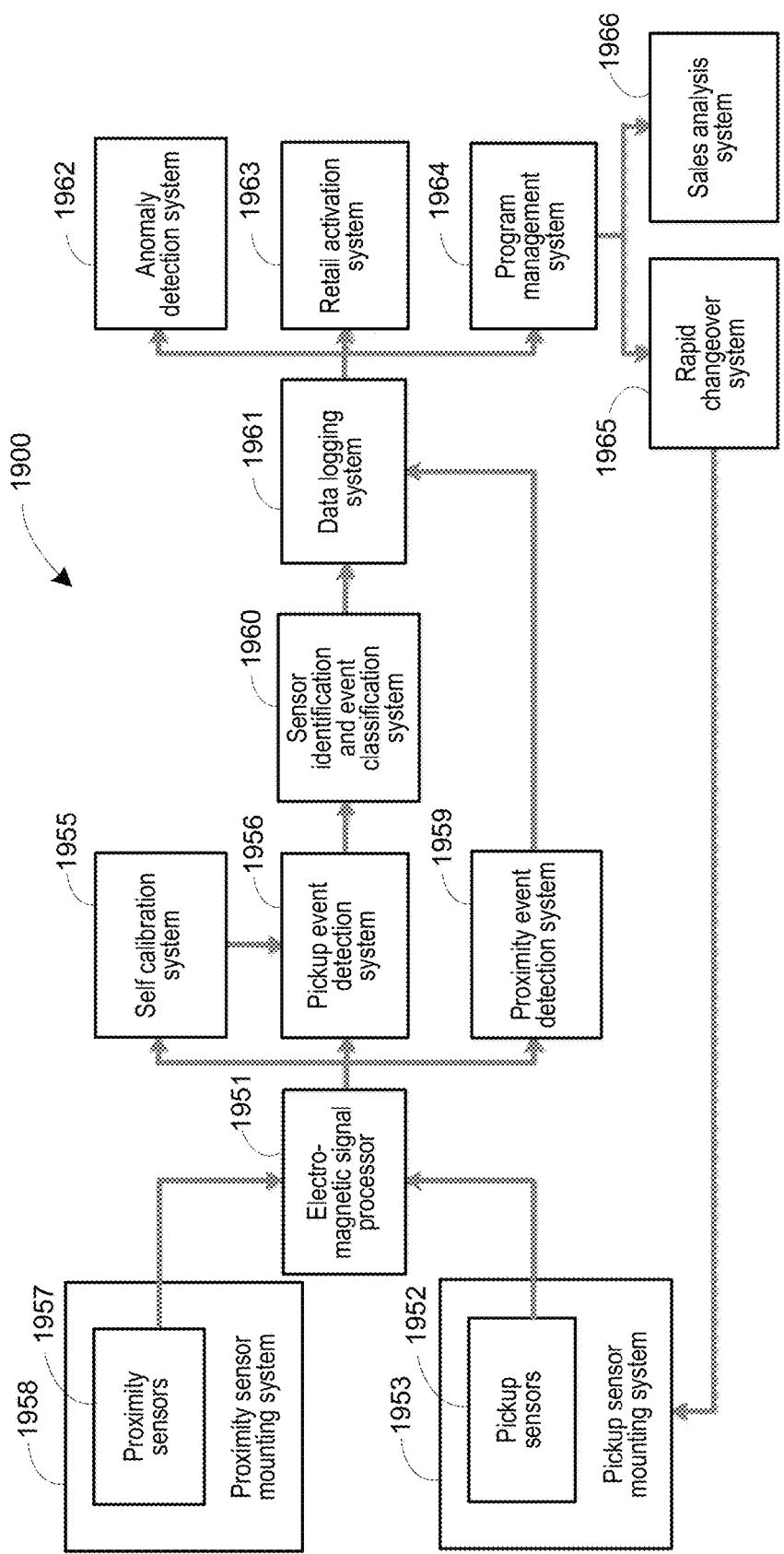
FIG. 19 illustrates a block diagram of an example of another OST system.

FIG. 19 illustrates a block diagram of an example of another OST system 1900, which can stand alone or be combined with the OST of FIG. 1 or 2. Depicted is an electromagnetic signal processor 1951 in communication with the one or more product sensors 1952 of a pickup sensor mounting system 1953, which samples output from the one or more product sensors 1952 periodically and converts an analog signal into a digital signal. Further, a self-calibration system 1955 can be in communication with the electromagnetic signal processor 1951, which detects background variability of the analog electromagnetic signal and therefrom establishes an activity threshold for each of the one or more product sensors 1952. The activity threshold is a configurable multiple of the background variability and represents sensitivity of an associated product sensor. Also connected to the processor 1951, is a pickup-event detection system 1956 that determines an initiation of an inventory event at one of the one or more inventory zones when variability of the respective analog signal exceeds the activity threshold. Also, the pickup-event detection system 1956 can suspend self-calibration during the inventory event, and can identify one or more other product sensors contributing to signaling the inventory event prior to completion of the inventory event. Furthermore, the pickup-event detection system 1956 determines termination of the inventory event when the variability of each of the respective analog electromagnetic signals has returned below the activity threshold of each of the contributing product sensors. Also connected to the processor 1951, is one or more proximity sensors 1957 of a proximity sensor mounting system 1958 associated operatively with respective one or more proximity zones measuring one or more of presence of a person, distance of a person from the sensor, two dimensional coordinates of a person within the one or more proximity zones, and any motion within the one or more proximity zones. The proximity sensor mounting system 1958 associated operatively with the one or more proximity sensors 1957, secures the one or more proximity sensors to or near the merchandising unit, and aligns a field of view of the one or more proximity sensors. Associated with such sensors and also connected to the processor 1951, is a proximity event detection system 1959 that detects proximity zone events that occur when an electromagnetic signal outputted by the one or more proximity sensors 1957 exceeds a configurable threshold.

Connected to a processor of an OST system, or as depicted in FIG. 19, connected to the pickup-event detection system 1956, is a sensor identification and event classification system 1960 configured to perform the following processes. First, the sensor identification and event classification system 1960 can determine one or more inventory event metrics from the analog electromagnetic signal, digital signal, or a derivative thereof for types of inventory events, including: start time, end time, starting load, ending load, difference between the starting and ending load, highest load, lowest load, difference between the highest and lowest load, maximum variance, and cumulative variance over an inventory event. Second, the sensor identification and event classification system 1960 can determine a function for each the one or more product sensors involved in the inventory event with respect to one or more of the one or more inventory event metrics. Also, the sensor identification and event classification system 1960 can identify each of the one or more product sensors signaling the inventory event, and based on one or more of the one or more inventory event metrics, can assign a type of inventory event, including: one or more pickups of the one or more units of product, one or more returns of the one or more units of product, one or more touches of the one or more units of product, a container refill event, and a container removal event.

Also, connected to a processor of an OST system, or as depicted in FIG. 19, connected to the sensor identification and even classification system 1960, is a data logging system 1961 that records information derived from a digital signal pertaining to one or more of an inventory event and a proximity zone event. Also, the data logging system 1961 can store information pertaining to each of the one or more of the events to a database, including: a unique identifier; a start time; duration of the event; initiation of the event; the one or more sensors signaling the event; one or more classifications of the event, including the type of inventory event if applicable; and any one of the one or more inventory event metrics. Further, a transmitter of the data logging system 1961 can transmit the information pertaining to each of the one or more of the events to a local display device, a remote display device, a local memory device, and/or a remote memory device.

Also, connected to a processor of an OST system, or as depicted in FIG. 19, connected to the data logging system 1961, is an anomaly detection system 1962 that detects anomalies of the respective analog electromagnetic signal. The anomaly detection system 1962 can detect anomalies that include unusually high variability, deactivation, or a sudden large change in a signal. After detecting an anomaly, the anomaly detection system 1962 provides a notification of the anomaly via a local or remote alert, such as audio, visual, vibration, and/or haptic alert. Further, connected to a processor of an OST system, or as depicted in FIG. 19, connected to the data logging system 1961, is a retail activation system 1963 that can generate or execute one or more of sensory stimuli including visual, audio, tactile, and olfactory stimuli; product sampling; coupon generation; and electronic signage.

In some embodiments, especially where there are more than one merchandising unit for possibly executing multiple experiments in parallel, an OST system can include a program management system for managing, executing, and administering the experiments. The program management system 1964 can select one or more of the records or fields of the records from the above-mentioned database. Then the program management system 1964 can determine, from the one or more of the records or the fields of the records from the database, whether a predetermined number of shoppers have passed by the more than one merchandising units to satisfy a statistical validity threshold, e.g., a threshold that represents a minimum number of shoppers the system must observe to provide a desired level of confidence in respective experimental data. Also, the program management system 1964 can manage: experiment configurations by direct end users of the system via electronic messages to implement the experiment configurations locally or remotely; progressively enhance calibration of units by comparing data from the one or more of the records or fields of the records from the database against manual audit results; and/or changing calibration parameters for detection of an inventory event.

Also, in some embodiments, an OST system can include a changeover system having one or more repetitions of the OST system. Such a changeover system 1965 can be configured according to a historical state and/or a current state of the OST system. Also, the changeover can be readily swappable with the OST system, and/or the components of the changeover system 1965 are readily swappable with the corresponding components of the OST system. Further, the components of the changeover system 1965 and the OST system 1900 can be swapped manually and/or automatically via a moveable merchandising apparatus, such as a rotating apparatus or an apparatus having a conveyor belt, and the program management system 1964 or an end user can control the moveable merchandising apparatus remotely or locally.

Furthermore, in some embodiments, an OST system can include a sales analysis system (the SAS) 1966 configured to perform various determinations and quantifications related to sales of product units. For example, the SAS 1966 can determine traffic patterns of shoppers within a predetermined distance from the merchandizing unit. Also, the SAS 1966 can quantify: a ratio of a number of shoppers performing an inventory event with respect to a total number of shoppers entering a predetermined region surveyed by the system; the value of a specific area on a merchandising unit (hotspot) after correcting for all other factors that could affect rate of sale, including demand for specific items and impact of facings; and additional sales created by adding additional facings of a specific item at any location on the merchandising unit. Also, the SAS 1966 can quantify an extent to which: shoppers' purchase decisions are impacted by changes in pricing for a specific item including both an effect on an item itself and all other items on the merchandising unit; sales performance of an item is impacted by either where a store hosting the merchandising unit is located or a specific location within the store; sales of any item are increased by placing literature, advertising or display materials (point of sale materials) on or near to the merchandising unit; sales of an item are impacted by a design of the merchandising unit on which it is displayed; different merchandising locations in store contribute toward the overall sales of an item; sales of an item or items are impacted by use of retail activation techniques designed to stimulate shoppers' senses including audio interruption (shelf talkers), audiovisual display, scenting systems, and vibration devices (rumblers); shopper interest in an item varies by time of day, including likelihood of a shopper to touch an item, and likelihood to purchase; purchase likelihood can be increased by use of retail activation techniques and point of sale materials; and new products contribute incrementally to overall sales when introduced in a specific store or merchandising location. Furthermore, the SAS 1966 can determine: a price point at which a product maximizes its incremental contribution to overall sales, taking into account both sales of the item itself and cannibalization of sales of other items on the same display; and an optimal location within a store having the merchandising unit or location on the merchandising unit which maximizes sales performance of a new product. Also, the SAS 1966 can quantify an overall incremental contribution of an item to overall sales (incrementality), taking into account sales performance of an item, decrease in sales of other items (cannibalization), and increase in sales of other items (halo); and determine items within a product line that provide least overall contribution to sales (tail items) in order to eliminate them from product line so as to create additional space for better performing items. Further, the SAS 1966 can quantify: an incrementality of direct and indirect competitors' products when included in a mix of items for sale; and an extent to which increasing or decreasing total number of items on display (range) contributes to overall sales performance.

Figure 20:
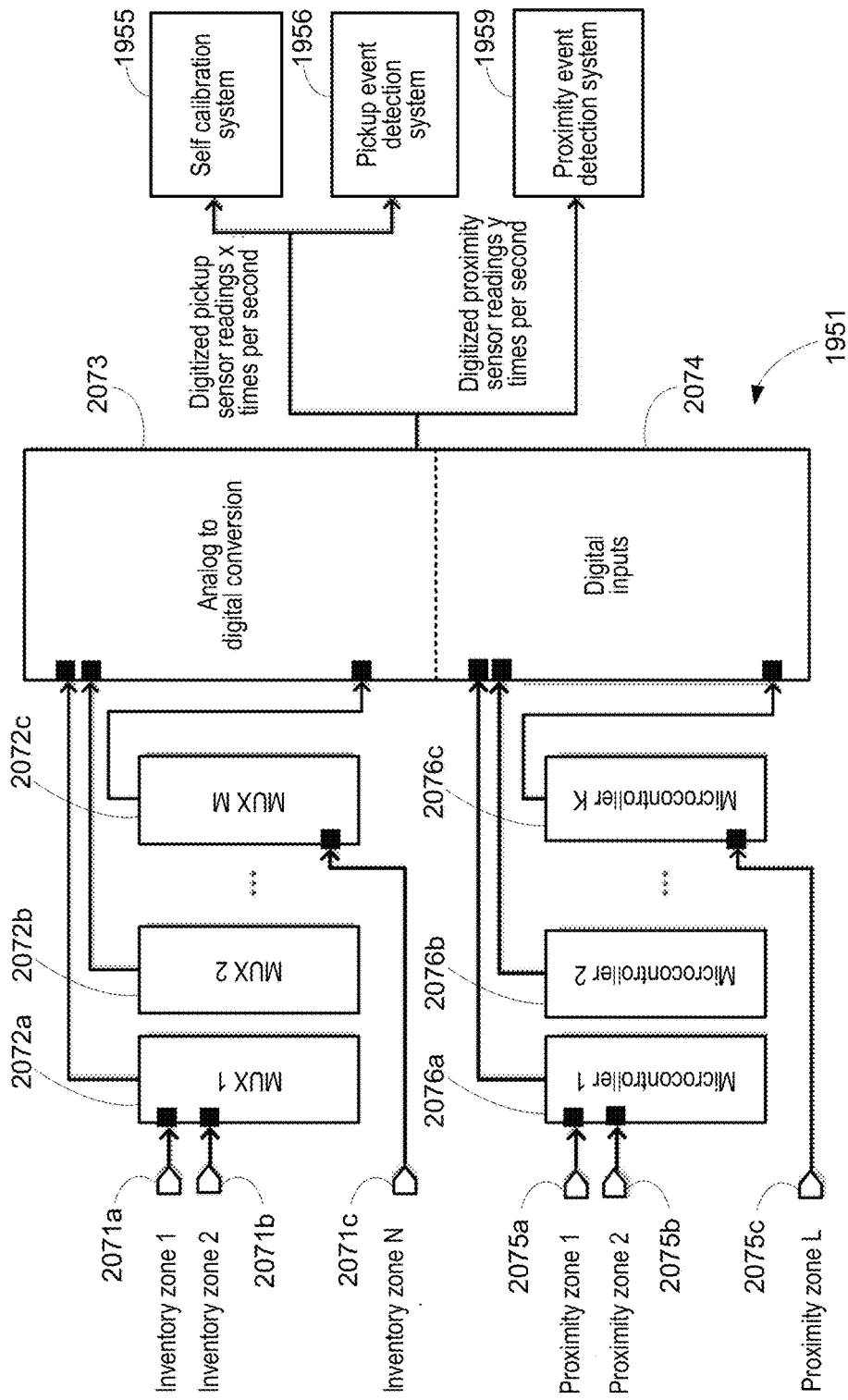
FIG. 20 illustrates an example electromagnetic signal processor of the OST system of FIG. 19.

With respect to sensors, connections, multiplexers, and input/outputs of the OST, FIG. 20 illustrates an example electromagnetic signal processor of an OST system configuration, such as the OST system configuration of FIG. 19. As depicted, input/outputs of inventory zones 1, 2, and N (including inputs 2071a-2071c) are selected respectively via multiplexors 2072a, 2072b, and 2072c. The selected input finds its way to an analog-to-digital converter 2073 and then digital input/outputs 2074 of the processor 1951 of FIG. 19. It is at the analog-to-digital converter 2073, where the digital information respective of sensed inventory events is converted from analog signals. With respect to the proximity zone events, there need not be an analog-to-digital conversion. As depicted, input/outputs of proximity zones 1, 2, and L (including inputs 2075a-2075c) are selected respectively via microcontrollers 2076a, 2076b, and 2076c. The selected inputs of the proximity zones then find their way to the sub-systems of the OST system via the processor 1951.

Eventually the digital information is communicated to the various sub-systems of the OST system, such as the self-calibration system 1955, the pickup-event detection system 1956, and the proximity event detection system 1959.

Figure 21:
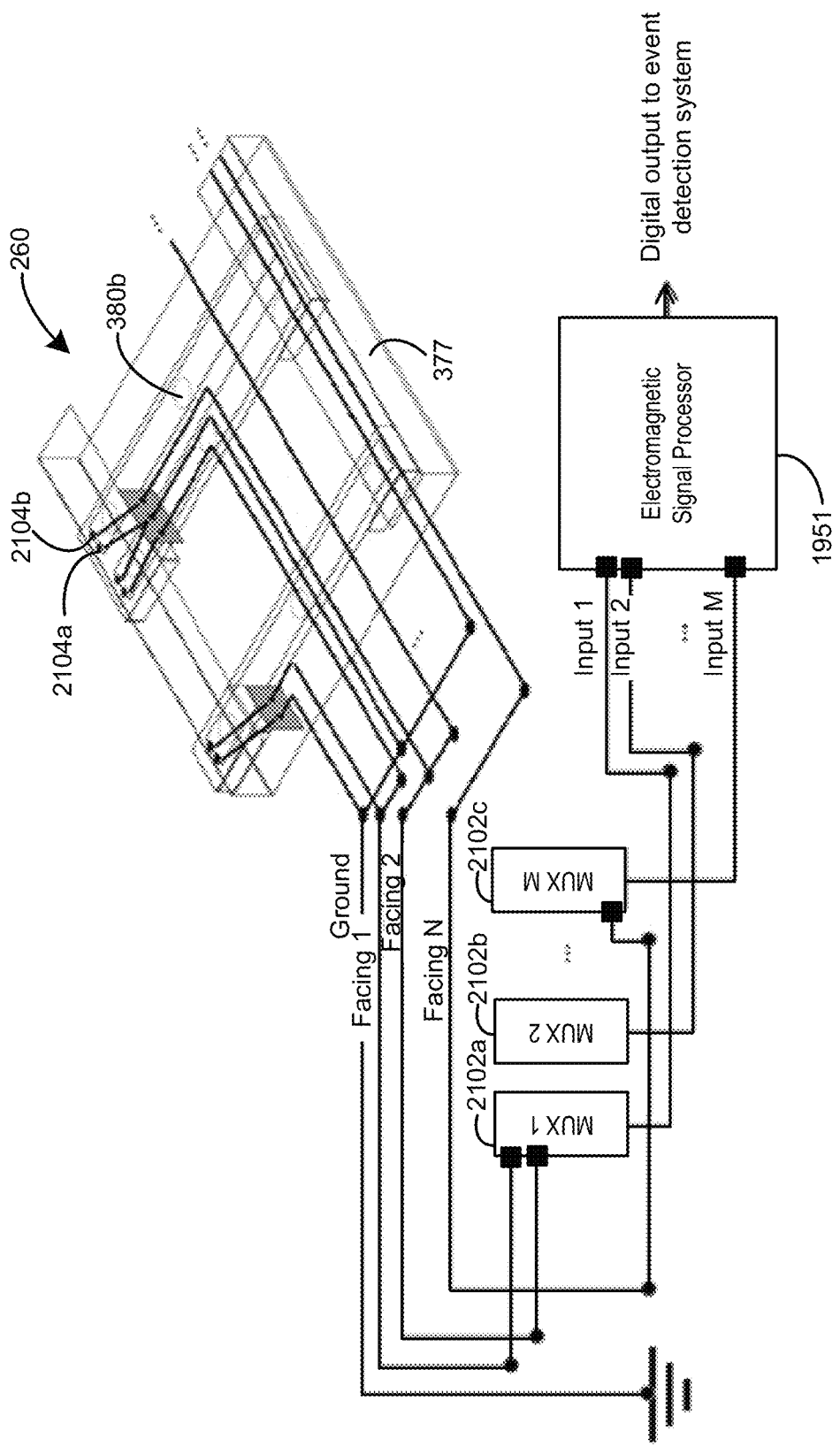
FIG. 21 illustrates connections between an example pickup sensor mounting system (also referred to as product sensor mounting system) having pickup sensors (also referred to as product sensors) and the electromagnetic signal processor of FIG. 13.
Figure 22:
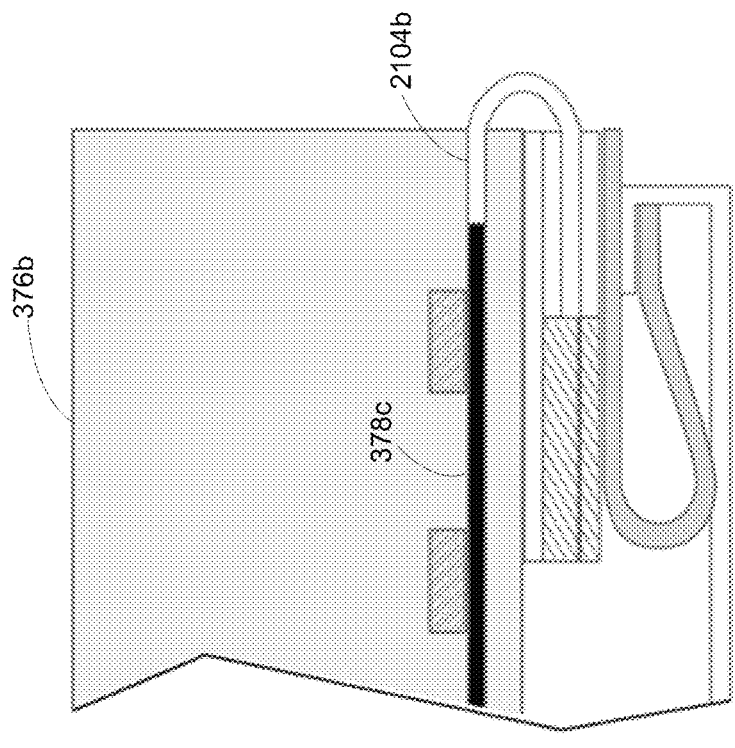
FIG. 22 illustrates, on the left, a front view of the pickup sensor mounting system of FIG. 21; and on the right, a side view of the pickup sensor mounting system of FIG. 21.
Figure 22:
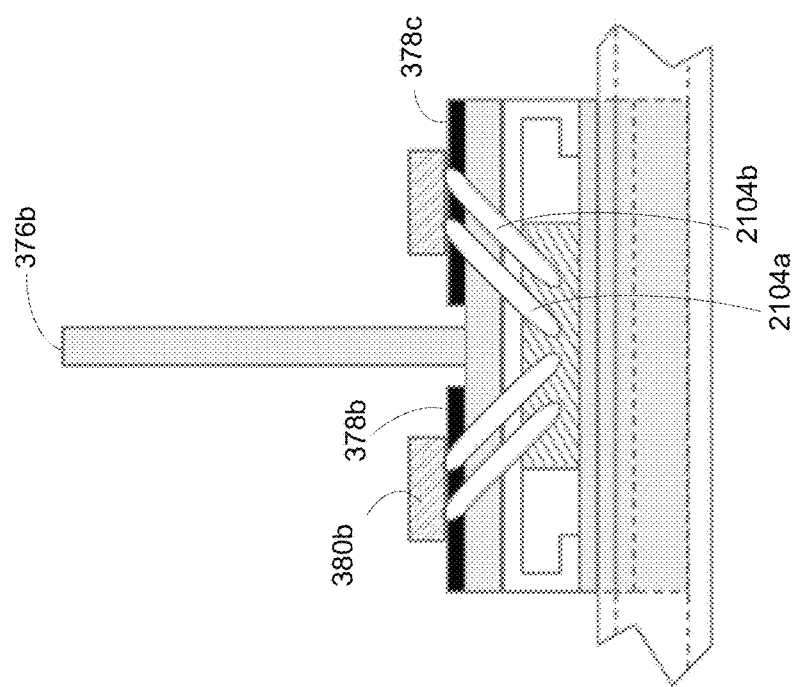

Regarding FIG. 21, illustrated are connections between an example pickup sensor mounting system (also referred to as a product sensor mounting system) having pickup sensors (also referred to as product sensors) and the electromagnetic signal processor of FIG. 20. Specifically, depicted are multiplexors 2102*a*, 2102*b*, 2102*c* that facilitate selecting analog signals generated from a sensor mounting system, such as the mounting system 260 of FIGS. 3-7. Also depicted is the actuator 380*b* and connectors 2104*a* and 2104*b* that connect the respective product sensor to wires and/or a control bus that eventually leads to the electromagnetic signal processor 1951. From a couple other perspectives, FIG. 22 illustrates, on the left, a front view of the pickup sensor mounting system of FIG. 21, and on the right, a side view of the pickup sensor mounting system of FIG. 21.

Figure 23:
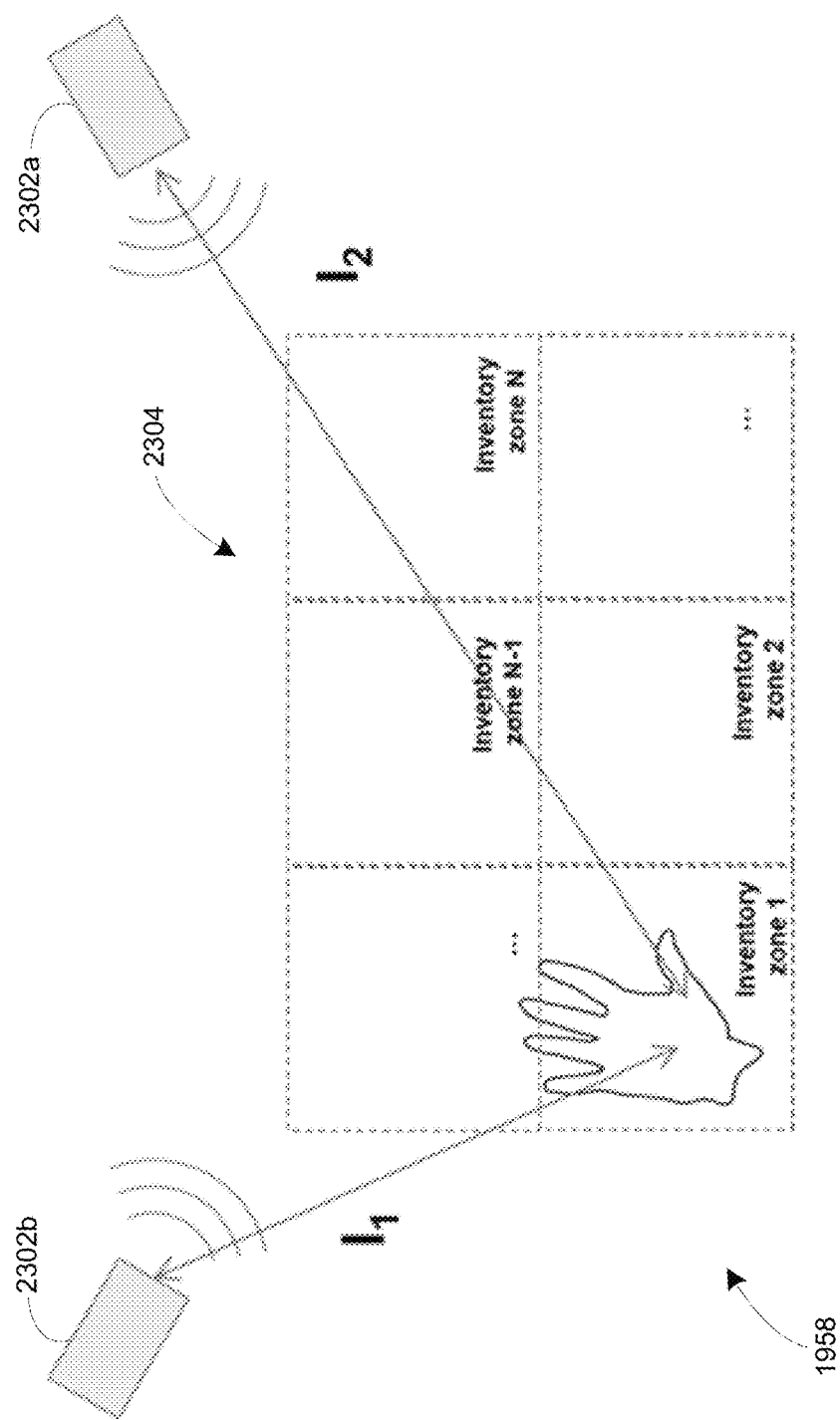
FIG. 23 illustrates example sensors that rely on sound or light waves for event detection that can be combined with an example OST system, such as one of the OST systems of FIGS. 1 and 2.

Further, FIG. 23 illustrates example proximity sensors 2302*a* and 2302*b* that rely on sound or light waves for event detection that can be combined with an example OST system, such as the OST systems of FIGS. 1 and 2. As depicted, the proximity sensors 2302*a* and 2302*b* identify an inventory event by movement of a shopper's hand reaching into a curtain of energy 2304 in front of the one or more inventory zones, where the proximity sensors or in other embodiments, distance sensing sensors, measure a distance from the shopper's hand to each of the one or more product sensors associated with inventory zones. Then based on the measured distances, the OST systems can locate coordinates of the shopper's hand and identify associated inventory zones and inventory events. Such sensors 2302*a* and 2302*b* can also detect items that are not necessarily immediately over an inventory zone. For example, the sensors 2302*a* and 2302*b* can detect a shopper or a basket, cart, bag or any other item used for carrying units approaching the OST system. Further, the OST system can switch to a power-save mode of operation when the one or more proximity sensors have not detected motion for a predetermined amount of time. In some embodiments, the inventory zone and sensor circuits can be configured to cycle on and off, in a polling fashion, according to a user configurable frequency and/or an automatically configured frequency by the OST system based on the power availability and power requirements determination and the OST system at a particular implementation location. This allows the maintenance of a sustainable power consumption rate.

Also, in some embodiments, the OST system can further include one or more video cameras surveying one or more of: an individual shopper so to identify biometric and demographic information, including approximate age, gender, mood, and ethnicity; and the merchandising unit to perform remote surveillance of the merchandising unit, including recording whether the shopper makes a purchase. Furthermore, the OST system can include one or more peripheral inventory zones in communication with the electromagnetic signal processor through a network, where the one or more peripheral inventory zones are not located at the merchandising unit.

Figure 24:
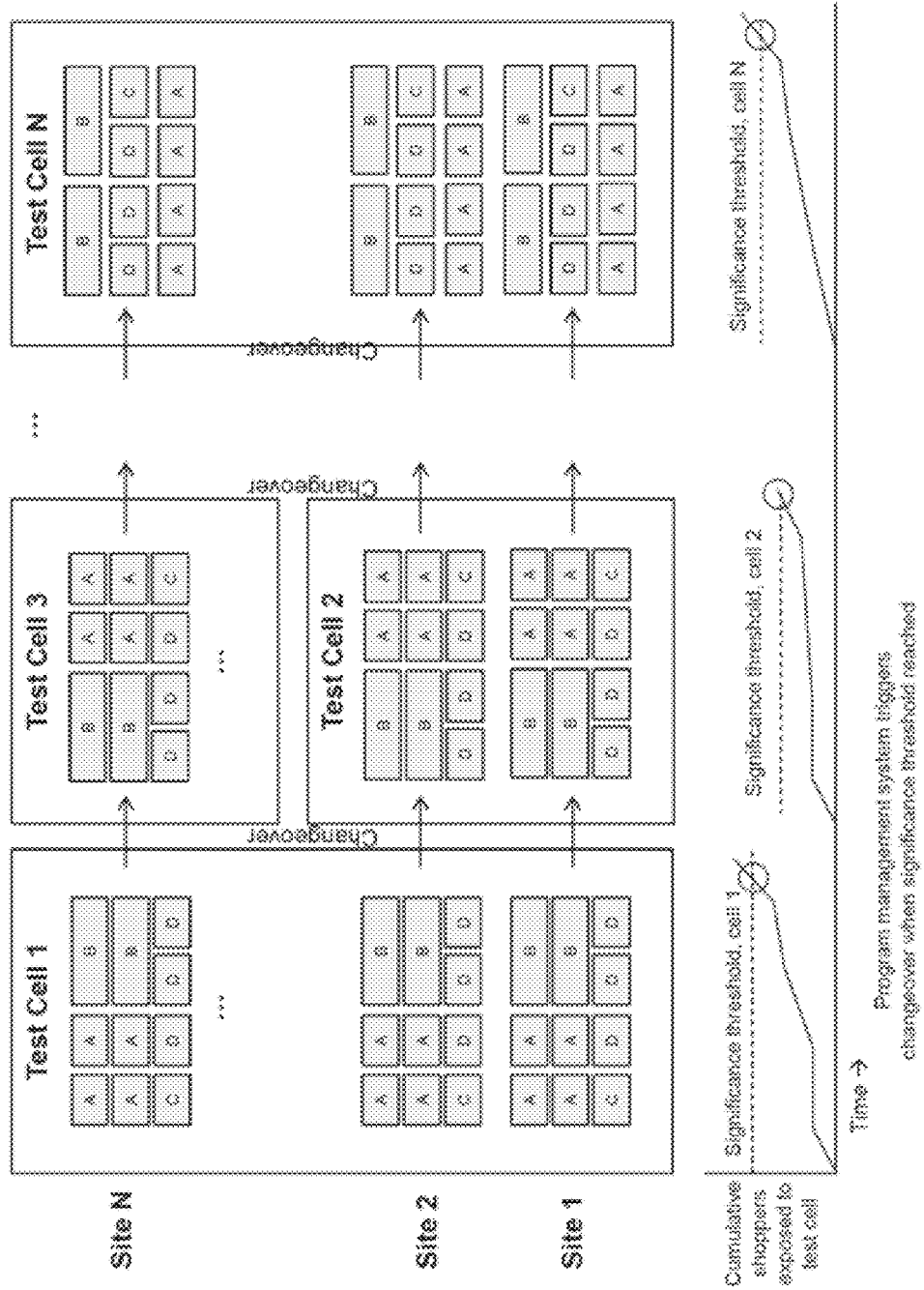
FIG. 24 illustrates operation of a program management system directing transition of test cells.

With respect to the program management system, FIG. 24 illustrates operation of a program management system directing transition of test cells. In this figure, the test cells represent collections of zones of multiple changeover systems.

Figure 25:
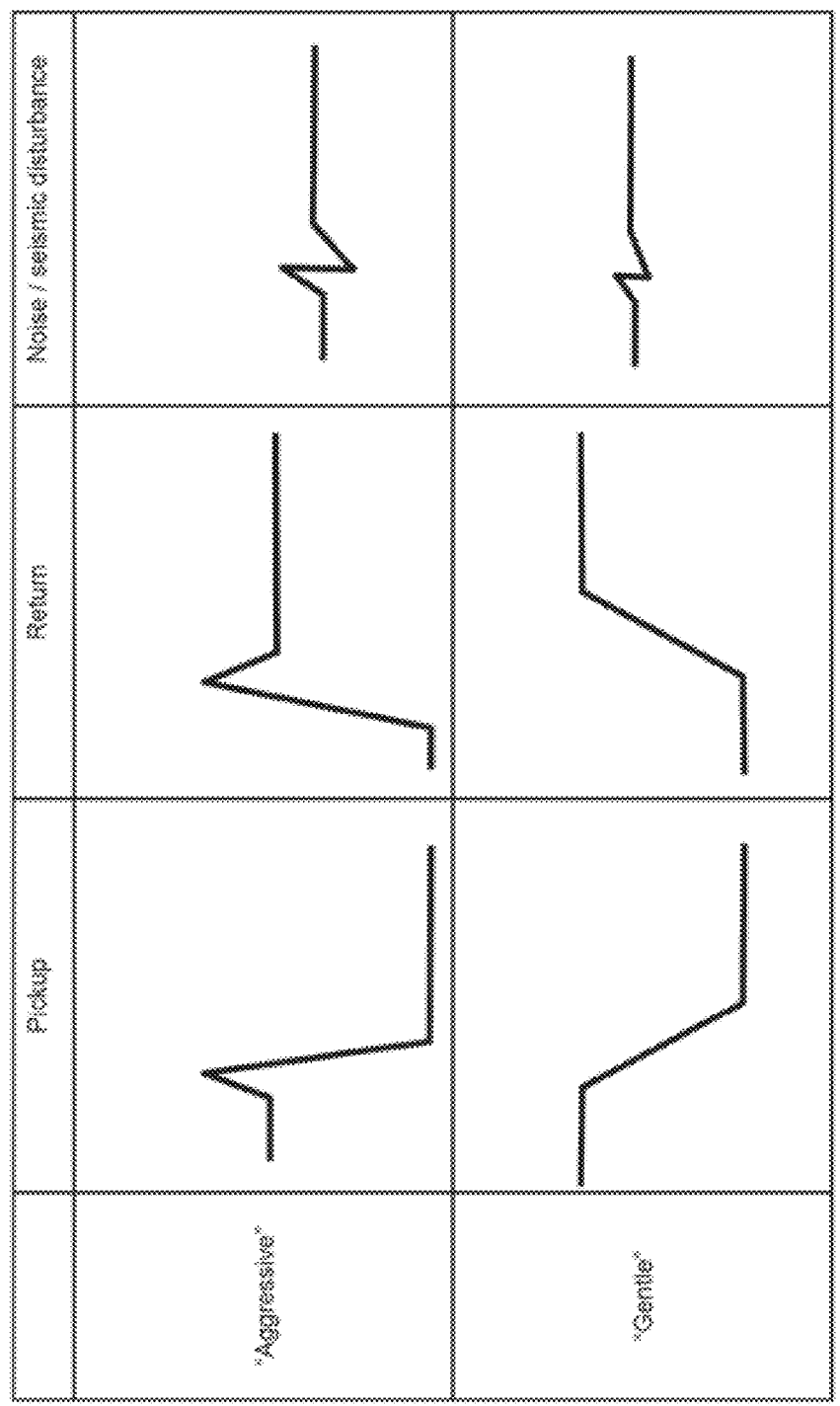
FIG. 25 illustrates graphs depicting electromagnetic signals generated by inventory events with respect to graphs depicting signals generated by noise.

FIG. 25 illustrates graphs depicting electromagnetic signals generated by inventory events with respect to graphs depicting noise.

Figure 26:
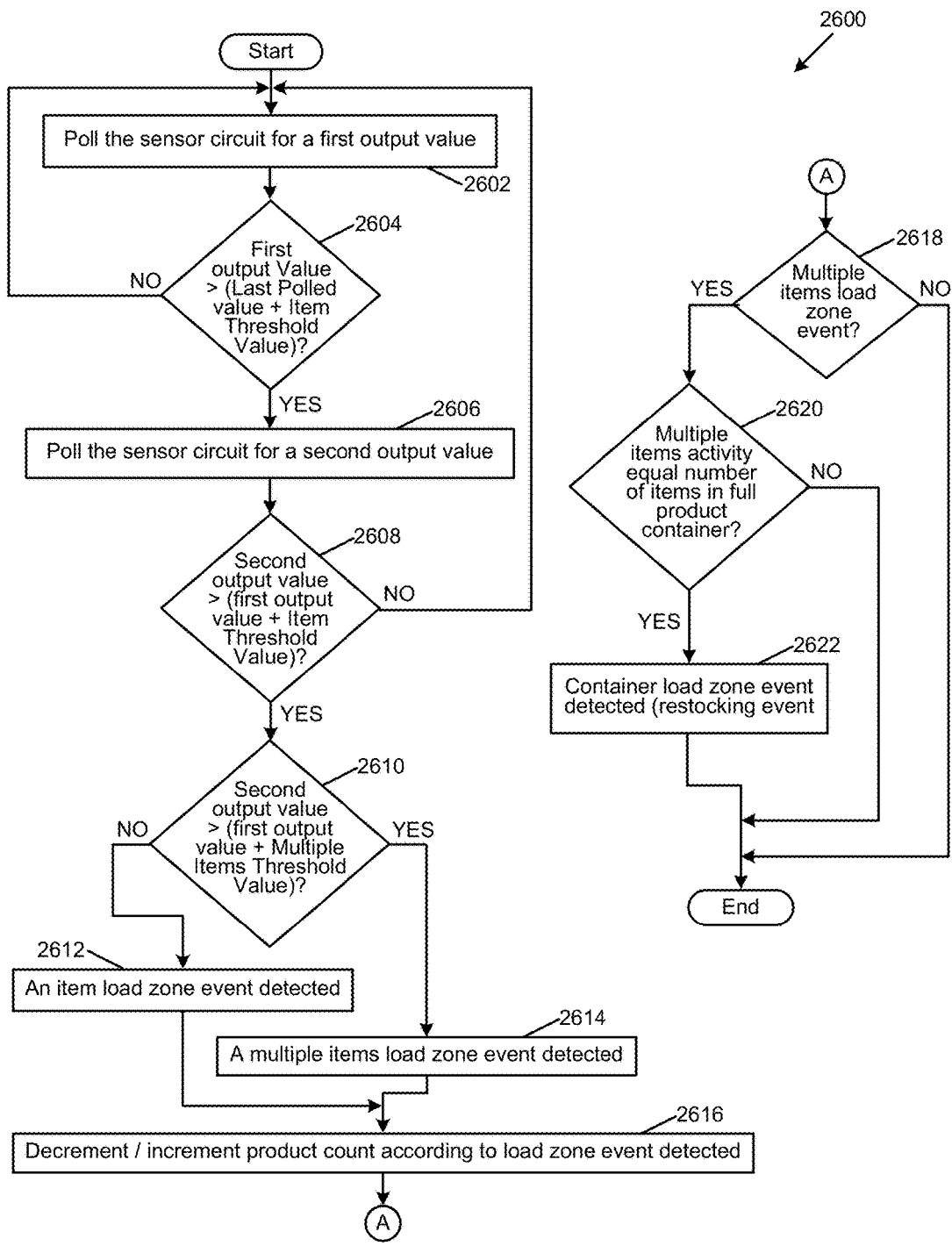
FIG. 26 illustrates an example method for determining when an inventory zone event has occurred.

From these outputs, the OST system can detect any number of inventory zone events including a setup event, a touch event, a single item pickup event, a multiple items pickup event, a single return item event, multiple return items event, a restock event, and an error event. For example, FIG. 26 illustrates an example method 2600 that determines occurrences of an inventory zone event. The method 2600 (e.g., represented by the OST instructions) can include the use of a standard deviation calculation calculated over multiple polling cycles in order to detect the start and the stop of an inventory zone event, and then based on the size and direction of change in signal from before the start of the event to after the stop of the event, the type of inventory zone event is determined.

Although the following example describes the use of voltage values output by the sensor to determine when an inventory zone event has occurred, various other electromagnetic properties outputted by the sensor circuit can be used (e.g., current, and frequency) to determine when an inventory zone event has occurred. The start_volts value and end_volts value described below refer to a first output value and a second output value outputted by the sensor circuit during a first and second time. The OST system identifies periods of activity on a given sensor circuit by comparing a sensed or calculated value (e.g., the standard deviation of the sensor circuit output over multiple time periods) against a configurable threshold, e.g., at steps 2604, 2608, or 2610. In some embodiments, when that threshold is exceeded the OST system determines that an inventory zone event has occurred and assigns a start_volts value to the last period before the inventory zone event began and an end_volts value to the period after the inventory zone event concluded; and by examining the difference between start_volts and end_volts, the OST system then determines the type of inventory zone event that has occurred, e.g., at steps 2612 or 2614. After the OST system determines the type of inventory zone event that has occurred, e.g., at the steps 2612 or 2614, the system decrements or increments the inventory count according to the load zone event detected, e.g., at a step 2616.

Specifically, the OST system can determine that a single item pickup event has occurred, e.g., at the step 2612. This determination can occur when the difference between start_volts and end_volts exceeds a single item threshold value, e.g., determined at the step 2608, but does not exceed a multiple items threshold value equal to a configurable multiple of the sensor circuit item value, e.g., determined at the step 2610. The OST system determines that a multiple items pickup event has occurred when the difference between the start_volts value and the end_volts value exceeds a multiple items threshold value, e.g., at the step 2614.

Regarding a load zone event, such as restocking, the OST system can determine that a restock event has occurred when the difference between the start_volts value and end_volts value exceeds a threshold equivalent the number of items used to fill a container as identified by a container identifier, e.g., at a step 2622). For example, in FIG. 26, the method 2600 again determines whether a multiple items load zone event has occurred at a step 2618, then determines whether the multiple items that were possibly removed from a container equals the remaining items last left in the container at a step 2620, and if both conditions are met then the method detects that a restocking event has occurred at the step 2622.

Regarding product assignments to inventory zones, the OST system can initially determine a subset of sensor circuits to assign to a container based on the force applied to the subset of sensor circuits when the container is placed on the subset of the first sensor circuits. In this way, portions of an inventory zone can be easily assigned to multiple different product containers.

Figure 27:
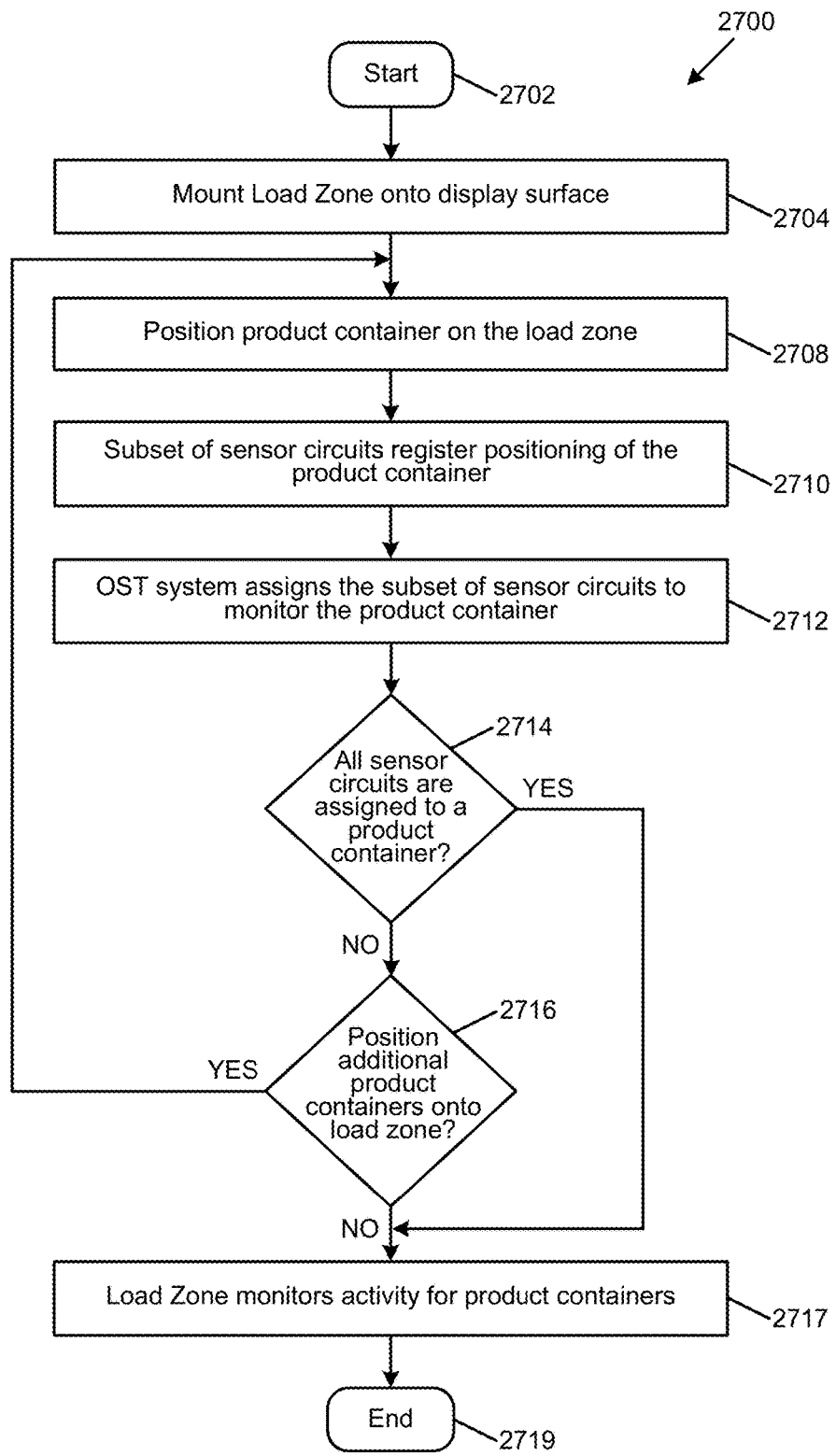
FIG. 27 illustrates an example method for assigning an inventory zone.

As found in some embodiments, FIG. 27 illustrates an example method 2700 that includes assigning an inventory zone to one or more portions of an inventory to multiple product containers. The method 2700 begins 2702 with mounting a product load zone onto a product display surface at a step 2704. Next, at a step 2708, position a product container on the load zone, where then a subset of sensor circuits register positioning of the product container at a step 2710, and the OST system assigns the subset of sensor circuits to monitor the container at a step 2712. Next, at steps 2714 and 2716, respectively, it is determined whether all sensor circuits are assigned to the product container and whether the inventory load zone is full; and if both conditions a true then the load zone monitors activity for the product container at a step 2717. Also, as shown by FIG. 27, if no sensor circuits are assigned to the product container, but the load zone is full, then the load zone still monitors activity for the product container at the step 2717.

With regard to the events in particular, the inventory zone can detect any number of inventory zone events including a setup event, a touch event, a single item pickup event, a multiple items pickup event, a single return item event, multiple return items event, a restock event, and an error event based on a set of configurable thresholds for each type of event.

Figure 28:
FIG. 28 illustrates an example event log.

FIG. 28 illustrates an example event log. The event log logs multiple inventory zone event records and proximity event records. Each record can include an event type indicator that indicates whether the inventory zone event is a product event or proximity event. Each inventory zone event log record can include an inventory zone event log identifier, an inventory zone event description, an inventory zone event physical location the time of the event, and the inventory zone number. A proximity event log record for a proximity type event can include data that indicates the time and duration of the event, a photograph of consumer (e.g., filename), a video of a purchase event (filename), biometrics (age, gender), and a photograph of the contents of a basket (filename).

With respect to the OST system and external systems that interact with the OST system, the logic, circuitry, and processing described above can be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for example, instructions for execution by a processor, controller, or other processing device. The medium can be implemented as any device that contains, stores, communicates, propagates, or transports executable instructions for use by or in connection with an instruction executable system, apparatus, or device. Alternatively or additionally, the logic can be implemented as analog or digital logic using hardware, such as one or more integrated circuits, or one or more processors executing instructions; or in software in an application programming interface (API) or in a Dynamic Link Library (DLL) functions available in a shared memory or defined as local or remote procedure calls; or as a combination of hardware and software.

In other implementations, the logic can be represented in a signal or a propagated-signal medium. For example, the instructions that implement the logic of any given program can take the form of an electronic, magnetic, optical, electromagnetic, infrared, or other type of signal. The systems described above can receive such a signal at a communication interface, such as an optical fiber interface, antenna, or other analog or digital signal interface, recover the instructions from the signal, store them in a machine-readable memory, and/or execute them with a processor.

The systems can include additional or different logic and can be implemented in many different ways. A processor can be implemented as a controller, microprocessor, microcontroller, application specific integrated circuit (ASIC), discrete logic, or a combination of other types of circuits or logic. Similarly, memories can be DRAM, SRAM, Flash, or other types of memory. Parameters (e.g., conditions and thresholds) and other data structures can be separately stored and managed, can be incorporated into a single memory or database, or can be logically and physically organized in many different ways. Programs and instructions can be parts of a single program, separate programs, or distributed across several memories and processors.

With respect to the benefits of the OST system, few systems have combined in one system, measurement of (i) real time shopper interactions with product at a level of individual facings on a merchandising unit, and (ii) real time measurement of shopper traffic in proximity to a test area. By explicitly measuring the abovementioned parameters, it is possible to explicitly breakdown sales performance of a product to its underlying drivers, which include: (i) shopper traffic in a location where product is displayed; (ii) a position on a merchandising unit where a product is placed relative to a hotspot); (iii) an extent to which multiple facings of product drives greater visibility; and (iv) after correcting for the preceding, an underlying performance of product itself. Further, determination of these factors allows for far more effective optimization of space and product line.

At the same time, challenges of measuring consumer activity in retail impulse space are many, including: (i) small serving sizes or very light weight product; (ii) variable sized product in both weight and dimension; (iii) high levels of shopper traffic and vibration; (iv) electrical noise from in store communications systems; (v) limited space for measurement equipment; (vi) need to minimize visibility of measurement equipment to shopper; (vii) non-technical store labor that required simple and robust systems; and (viii) most valuable locations for impulse products having least sophisticated retail technology, e.g., few kiosks have bar scanners. The benefit of the OST system is that it combines product interaction and shopper traffic measurements so as to provide a retailer with a powerful new tool for optimizing their space and product lines, while overcoming the aforementioned challenges.

The above-disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system to be installed on a merchandising unit, comprising:

a plurality of inventory zones, where within the inventory zones, the inventory zones present a plurality of units of product in a container in a geometric pattern of multiple layers deep, and
wherein the container comprises a retail carton;
one or more product sensors located entirely outside of the retail carton, each at least associated operatively with one or more of the inventory zones, and configured to transmit respective electromagnetic signals indicative of quantity of units of product within the retail carton, wherein at least one sensor of the one or more product sensors has a raised actuator concentrating load of at least one of the plurality of units of product onto a load sensitive part of the at least one sensor of the one or more product sensors;
a mounting structure configured to secure the one or more product sensors to the merchandising unit, and including at least one divider configured to act as a boundary of at least one zone of the inventory zones; and
an electromagnetic signal processor in communication with the one or more product sensors,
wherein the one or more product sensors or corresponding circuits are arranged in parallel strips at or abutting the at least one divider, the at least one divider including T or L dividers connected to the mounting structure,
wherein the one or more product sensors are attached on an upward facing surface of the mounting structure or the dividers, so as to align the one or more sensors to contact a location on an underside of the container holding the plurality of units of product,
wherein the mounting structure is adjustable, and
wherein the mounting structure comprises a sliding track that facilitates adjusting the position of the T or the L dividers on the sliding track.

2. The system of claim 1, further comprising a sensor identification and event classification system, configured to:
determine inventory event metrics from an electromagnetic signal, digital signal, or a derivative thereof for types of inventory events, including: start time, end time, starting load, ending load, difference between the starting and ending load, highest load, lowest load, difference between the highest and lowest load, maximum variance, and cumulative variance over an inventory event;
determine a function for each of the one or more product sensors involved in the inventory event with respect to one or more of the inventory event metrics;
identify each of the one or more product sensors signaling the inventory event; and
based on the one or more inventory event metrics, assign a type of inventory event, including: one or more pickups of the one or more of the plurality of units of product, one or more returns of the one or more of the plurality of units of product, one or more touches of one or more of the plurality of units of product, a container refill event, and a container removal event.

3. The system of claim 1, further comprising:
one or more proximity zones next to the merchandising unit;
one or more proximity sensors associated operatively with each of the one or more proximity zones measuring one or more of presence of a person, distance of a person from the sensor, two dimensional coordinates of a person within the one or more proximity zones, and, any motion within the one or more proximity zones;
a proximity sensor mounting system associated operatively with the one or more proximity sensors, which secures the one or more proximity sensors to or near the merchandising unit, and which aligns a field of view of the one or more proximity sensors; and
a proximity event detection system that detects a proximity zone event that occurs when an electromagnetic signal outputted by the one or more proximity sensor exceeds a configurable threshold.

4. The system of claim 3, where the one or more proximity sensors are configurable to detect a basket, cart, bag or any other item used for carrying units of product.

5. The system of claim 1, where the one or more product sensors are mounted at a support point of a peg hook so that as load is applied to the peg hook the load is transmitted to the one or more product sensors.

6. The system of claim 1, where the one or more product sensors are one or more of a sensor that relies on sound waves and a sensor that relies on light waves, where the one or more sensors identifies an inventory event by movement of a shopper's hand reaching into a curtain of energy in front of the inventory zones, where two or more distance sensing sensors measure a distance from the shopper's hand to each of the one or more product sensors, and based on the measured distances, the system locates coordinates of the shopper's hand and identifies associated inventory zones and inventory events.

7. The system of claim 1, further comprising one or more peripheral inventory zones in communication with the electromagnetic signal processor through a network, where the one or more peripheral inventory zones are not located at the merchandising unit.

8. The system of claim 1, where the one or more sensors are arranged to cover an entire area of a shelf of the merchandising unit, and where a respective circuit of each of the one or more sensors is one or more of the following circuit shapes: a honeycomb circuit shape, a square circuit shape, and a round circuit shape.

9. The system of claim 8, where the mounting structure is a flexible printed circuit board that can be rolled out into place on a display surface of the merchandising unit.

10. The system of claim 1, where the mounting structure positions of the one or more product sensors on a display surface edge lip perpendicular to a display surface, and where an angle of tilt of the display surface exceeds a configurable display surface tilt angle threshold.

11. The system of claim 1, where the one or more product sensors are connected to a spring or are integrated with a spring to detect removal or addition of a lightweight product.

12. The system of claim 1, further comprising one or more video cameras surveying one or more of:
an individual shopper so to identify biometric and demographic information, including approximate age, gender, mood, and ethnicity; and
the merchandising unit to perform remote surveillance of the merchandising unit, and a full set of items that a shopper is purchasing including items from other parts of a store remote from the merchandising unit.

13. The system of claim 1, further comprising an anomaly detection system that detects anomalies of the respective electromagnetic signal, where the anomalies include unusually high variability, deactivation, or a sudden large change, and where the anomaly detection system, after detecting an anomaly provides a notification of the anomaly via a local or remote alert.

14. The system of claim 1, further comprising a retail activation system able to generate or execute one or more of:

sensory stimuli including visual, audio, tactile, and olfactory stimuli;
product sampling;
coupon generation; and
electronic signage.

15. The system of claim 1, where there are more than one merchandising units for possibly executing multiple experiments in parallel, further comprising:
a program management system for managing experiments administered on the more than one merchandising units, configured to:
select one or more of records or fields of a database associated with the system;
determine, from the one or more of the records or the fields, whether a predetermined number of shoppers have passed by the more than one merchandising units to satisfy a statistical validity threshold, which represents a minimum number of shoppers the system must observe to provide a desired level of confidence in respective experimental data;
manage experiment configurations by one or more of:
direct end users of the system via electronic messages to implement the experiment configurations locally or remotely; and
progressively enhance calibration of units by comparing data from the one or more of the records or fields against manual audit results and changing calibration parameters for detection of an inventory event.

16. The system of claim 1, further comprising a self-calibration system in communication with the electromagnetic signal processor that detects background variability of an electromagnetic signal and therefrom establishes an activity threshold for each of the one or more product sensors, wherein the activity threshold is a configurable multiple of the background variability, and wherein the activity threshold represents sensitivity of an associated product sensor.

17. The system of claim 1, further comprising a pickup-event detection system located entirely outside of the retail carton that determines an initiation of an inventory event at one of the inventory zones when variability of a respective analog signal exceeds an activity threshold, where the pickup-event detection system suspends self-calibration during the inventory event, where the pickup-event detection system identifies one or more other product sensors contributing to signaling the inventory event prior to completion of the inventory event, and where the pickup-event detection system determines termination of the inventory event when the variability of the respective analog signal has returned below the activity threshold of each of the contributing product sensors, wherein the pickup-event detection system is configured to detect removal of a single unit of product from the retail carton based on a signal output from the one or more sensors.

18. A system to be installed on a merchandising unit, comprising:
a plurality of inventory zones, where within the inventory zones, the inventory zones present a plurality of units of product in a container in a geometric pattern of multiple layers deep;
one or more product sensors located entirely outside of the container, each at least associated operatively with one or more of the inventory zones, and configured to transmit respective electromagnetic signals indicative of the quantity of units of product within the container;
a mounting structure configured to secure the one or more product sensors to the merchandising unit, and including at least one divider configured to act as a boundary of at least one zone of the inventory zones;
an electromagnetic signal processor in communication with the one or more product sensors;
one or more proximity zones next to the merchandising unit; and
one or more proximity sensors associated operatively with each of the one or more proximity zones measuring one or more of presence of a person, distance of a person from a proximity sensor, two dimensional coordinates of a person within the one or more proximity zones, and, any motion within the one or more proximity zones,
wherein the one or more product sensors or corresponding circuits are arranged in parallel strips at or abutting the at least one divider, the at least one divider including T or L dividers connected to the mounting structure,
wherein the one or more product sensors are attached on an upward facing surface of the mounting structure or the dividers, so as to align the one or more product sensors to contact a location on an underside of the container holding the plurality of units of product,
wherein the mounting structure is adjustable,
wherein the mounting structure comprises a sliding track that facilitates adjusting the position of the T or the L dividers on the sliding track.

19. A system to be installed on a merchandising unit, comprising:
a plurality of inventory zones, where within the inventory zones, the inventory zones present a plurality of units of product in a container in a geometric pattern of multiple layers deep;
one or more product sensors located entirely outside of the container, each at least associated operatively with one or more of the inventory zones, and configured to transmit respective electromagnetic signals indicative of the quantity of units of product within the container; and
a mounting structure configured to secure the one or more product sensors to the merchandising unit, and including at least one divider configured to act as a boundary of at least one zone of the inventory zones,
wherein the mounting structure is modular,
wherein positioning of the one or more product sensors or corresponding circuits includes arranging the one or more product sensors or the corresponding circuits in parallel strips at or abutting dividers, which are T or L dividers connected to the mounting structure,
wherein the one or more product sensors are attached on an upward facing surface of the mounting structure or the dividers, so as to align the one or more sensors to contact a location on an underside of the container holding the units of product,
wherein the mounting structure is adjustable, and
wherein the mounting structure comprises a sliding track that facilitates adjusting the position of the T or the L dividers on the sliding track.

20. The system of claim 19, where the sliding track is readily fastened and unfastened from the mounting structure without hardware tools, and where the adjusting the position of the T or L dividers is readily done without hardware tools.

21. The system of claim 19, where the sliding track is configured to form a channel, where the channel is manufacturable to fit any size shelf, where wires associated with the one or more sensors run within the channel so to conceal the wires, where the wires terminate at a connector on one edge of the mounting structure from where the wires are further wired to an electromagnetic signal processor, and where the one or more product sensors are fixed to respective parts of the sliding track that interlock so as to allow for adjusting a respective position of the one or more product sensors.

\* \* \* \* \*